United States Patent
Kitamura et al.

(10) Patent No.: US 9,753,350 B2
(45) Date of Patent: Sep. 5, 2017

(54) MACH-ZEHNDER MODULATOR, METHOD OF MAKING OPTICAL WAVEGUIDE STRUCTURE

(71) Applicant: SUMITOMO ELECTRIC INDUSTRIES, LTD., Osaka (JP)

(72) Inventors: Takamitsu Kitamura, Yokohama (JP); Masataka Watanabe, Yokohama (JP); Hideki Yagi, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/078,671

(22) Filed: Mar. 23, 2016

(65) Prior Publication Data

US 2016/0282701 A1 Sep. 29, 2016

(30) Foreign Application Priority Data

Mar. 24, 2015 (JP) ................................ 2015-061387

(51) Int. Cl.
  *G02F 1/225* (2006.01)
  *G02F 1/21* (2006.01)

(52) U.S. Cl.
  CPC ...... *G02F 1/2257* (2013.01); *G02F 2001/212* (2013.01)

(58) Field of Classification Search
  None
  See application file for complete search history.

(56) References Cited

U.S. PATENT DOCUMENTS

| | | | |
|---|---|---|---|
| 7,187,837 B2* | 3/2007 | Gothoskar | G02B 6/12004 257/431 |
| 2005/0094924 A1* | 5/2005 | Forrest | B82Y 20/00 385/14 |
| 2015/0043867 A1* | 2/2015 | Kono | G02F 1/2257 385/3 |

FOREIGN PATENT DOCUMENTS

| | | |
|---|---|---|
| JP | 2006-065085 | 3/2006 |
| JP | 2011-39262 A * | 2/2011 |

* cited by examiner

*Primary Examiner* — Mike Stahl
(74) *Attorney, Agent, or Firm* — Smith, Gambrell & Russell, LLP

(57) ABSTRACT

A Mach-Zehnder modulator comprises first to third semiconductor structures provided on first to third areas of a primary surface of a conductive semiconductor region, respectively. The second semiconductor structure includes a semiconductor laminate and a first contact portion thereon. The third semiconductor structure includes the semiconductor laminate and a second contact portion thereon. The first and second contact portions constitute a contact layer. The second semiconductor structure has first and second waveguide sides. The first contact portion has an edge which terminates the contact layer and extends in a direction of a first reference plane on the top of the semiconductor laminate to reach the first waveguide side. The first reference plane and a top of the second semiconductor structure intersect with each other to define a line of intersection obliquely-crossed with an upper edge of the first waveguide side at a first angle different from a right angle.

20 Claims, 17 Drawing Sheets

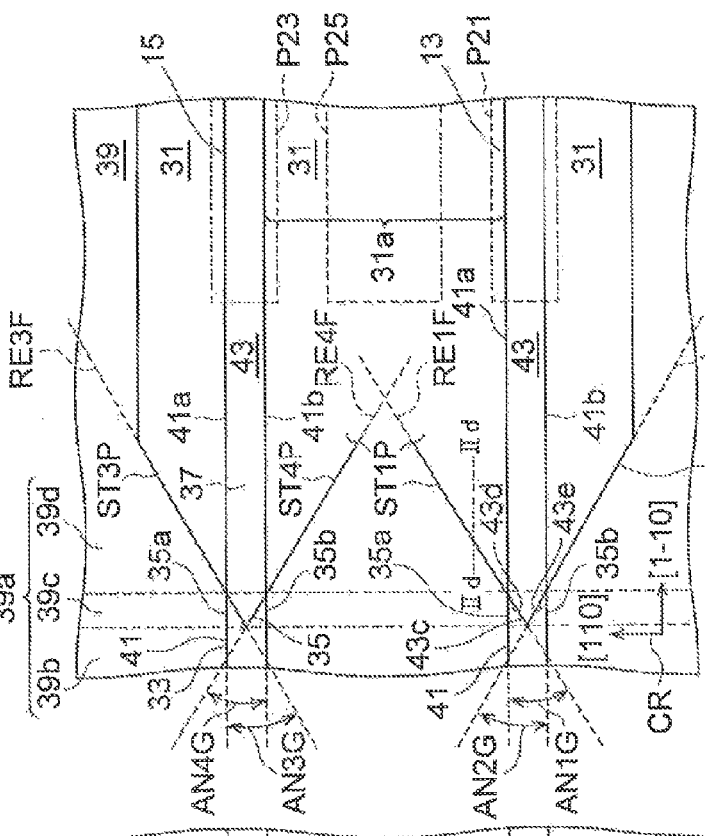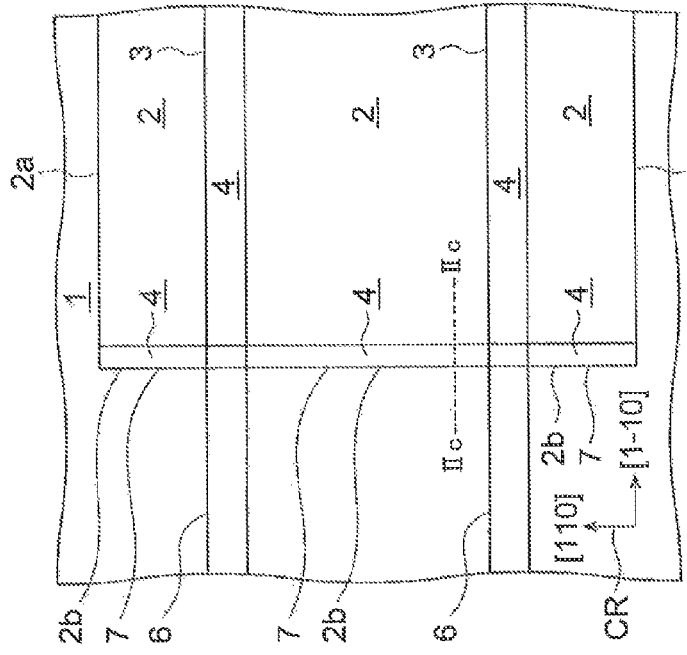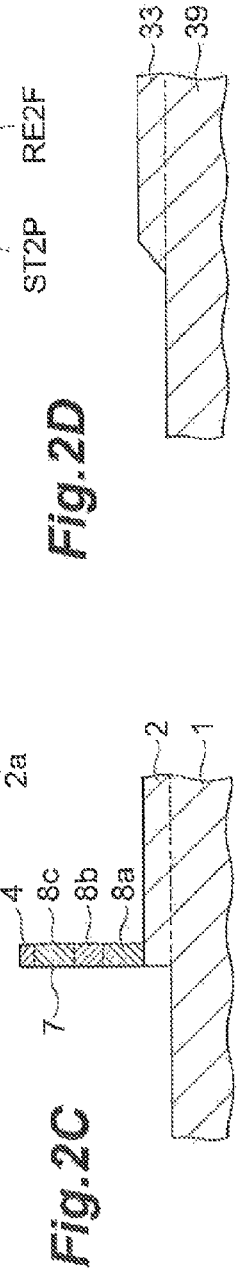

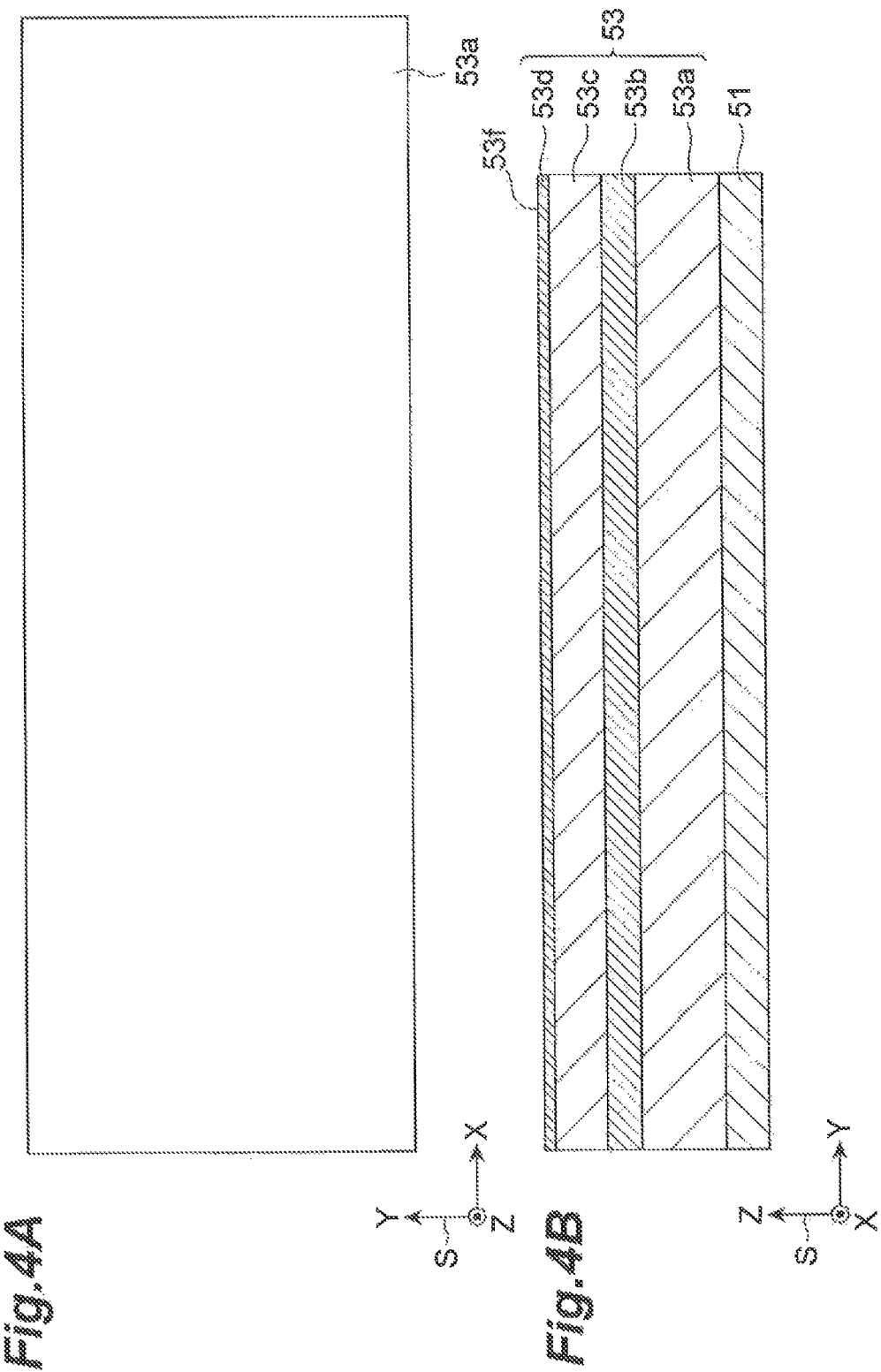

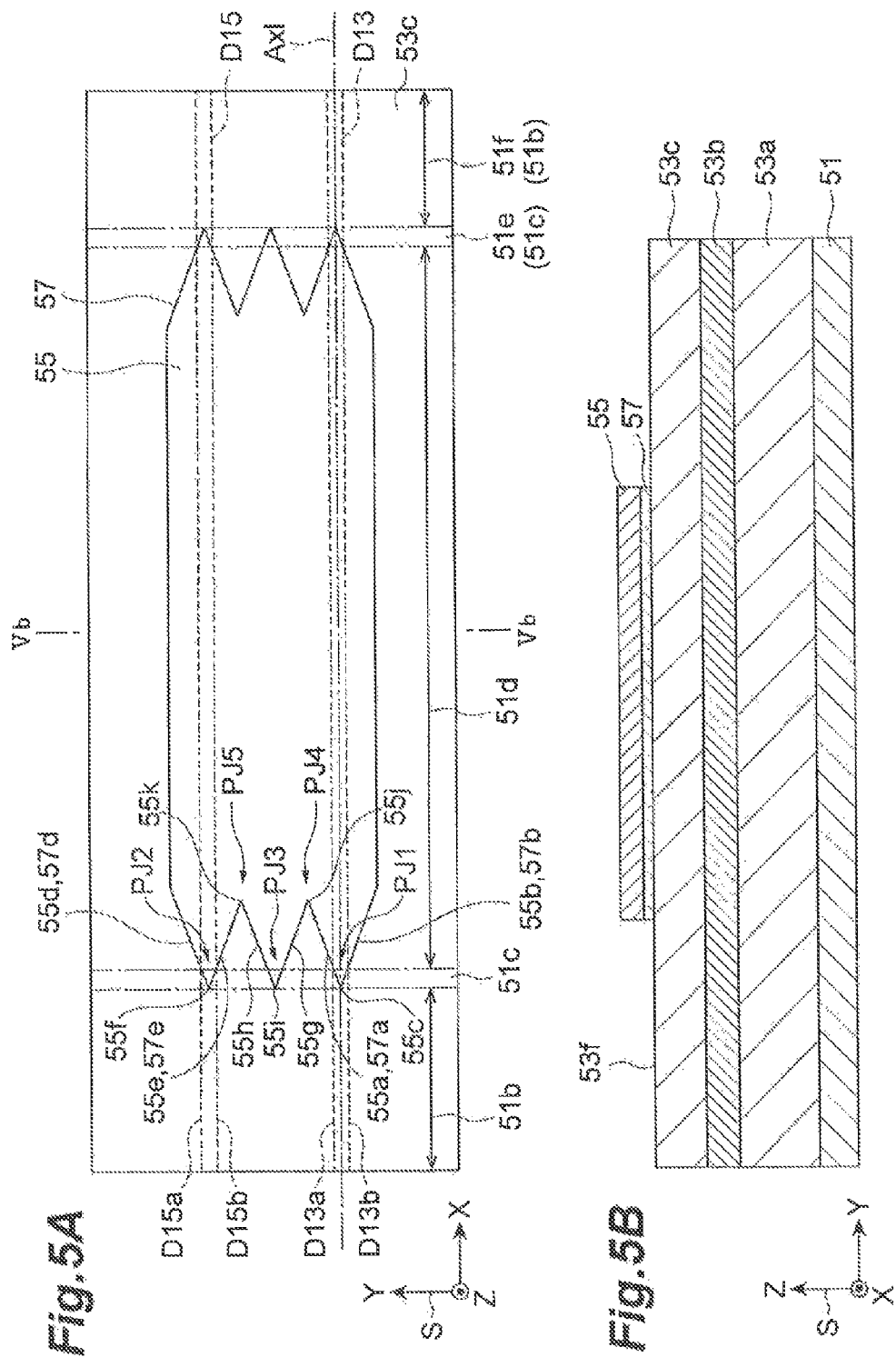

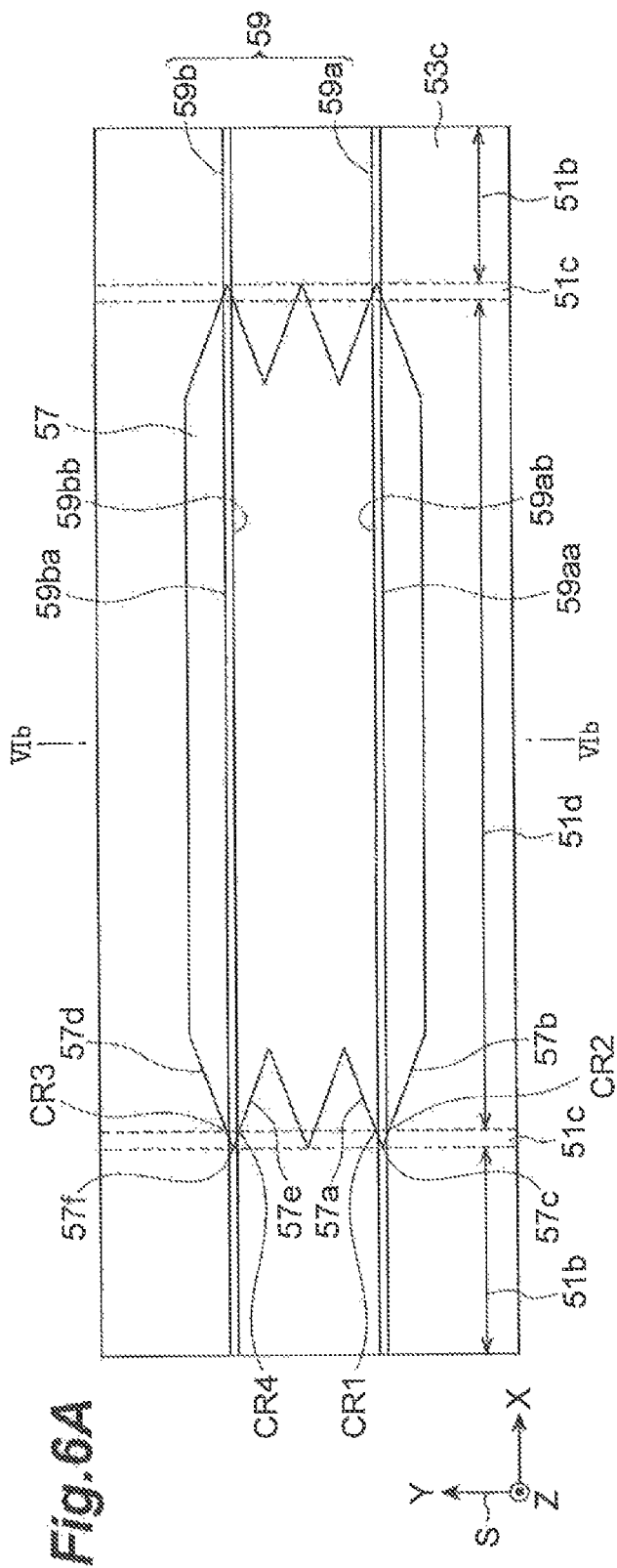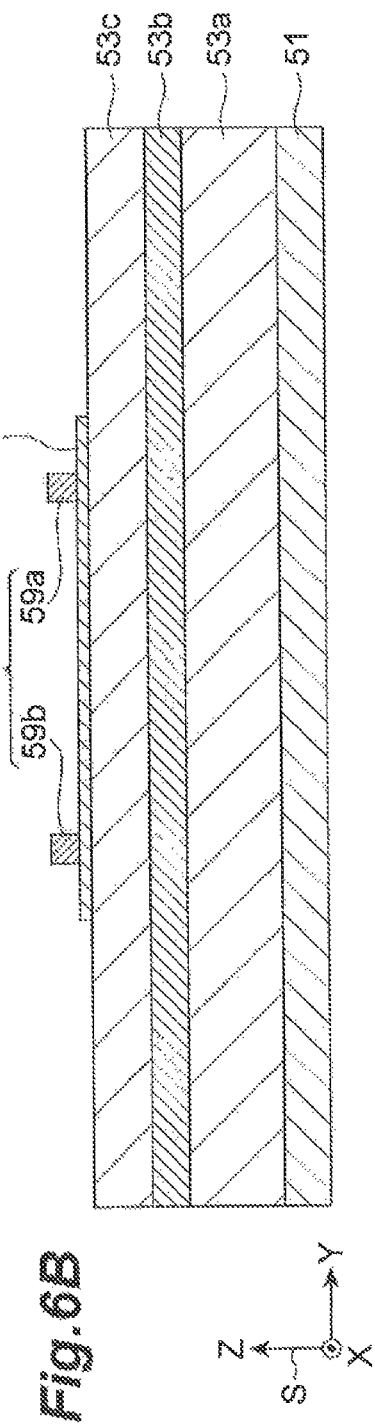

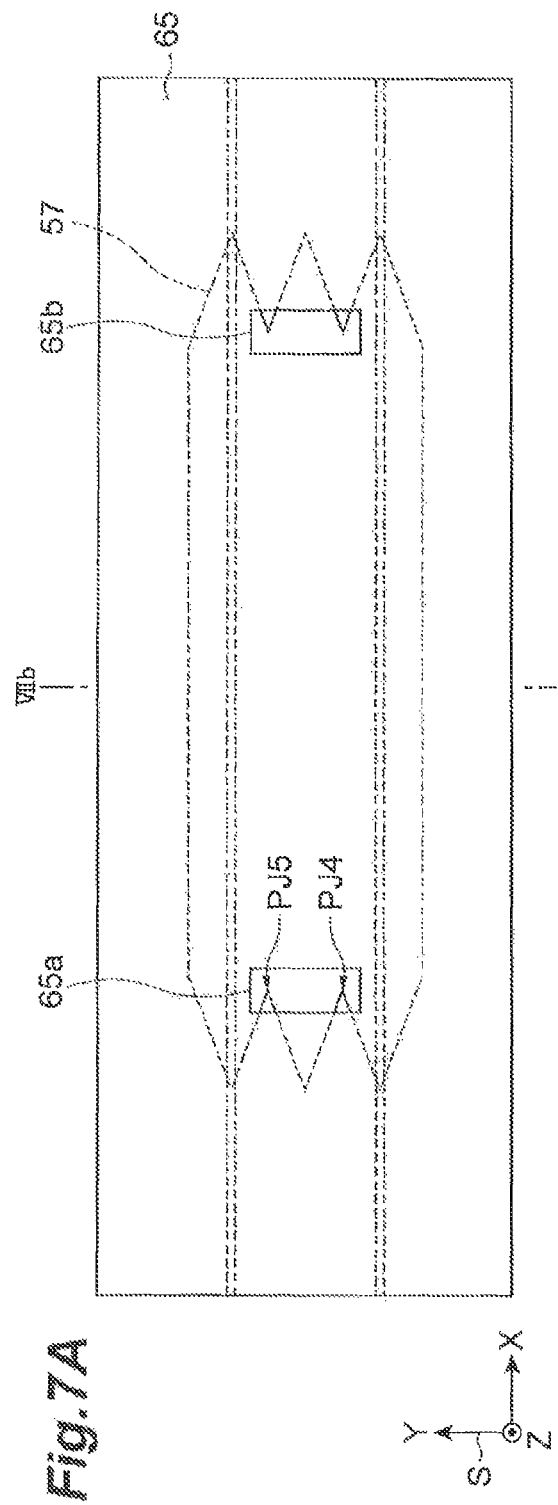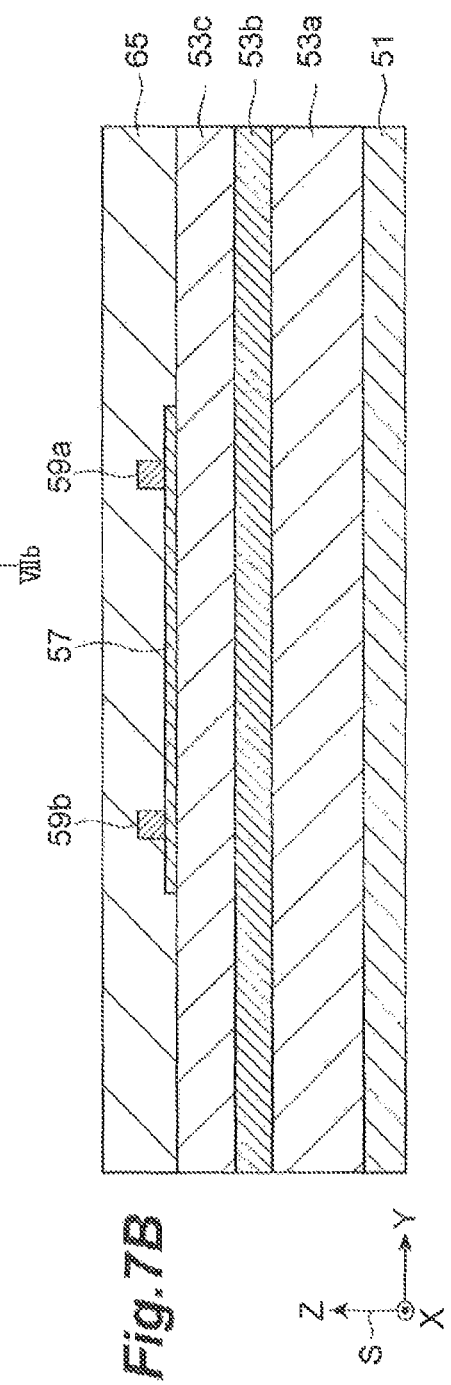

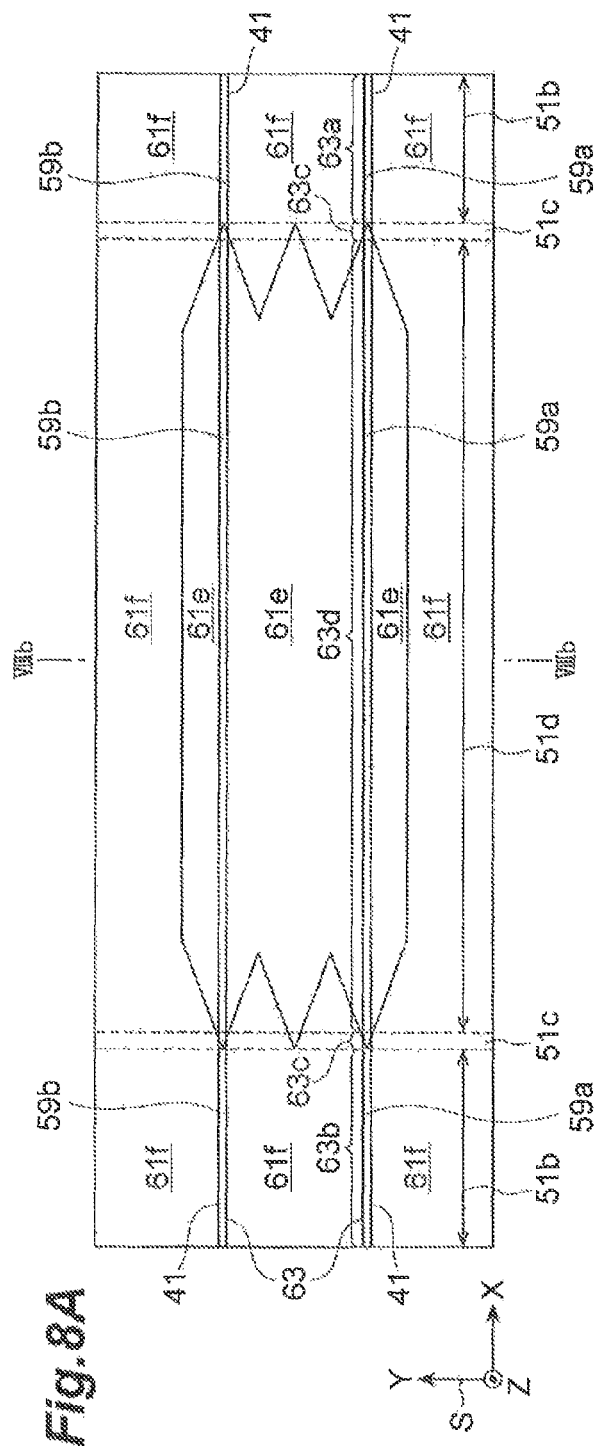
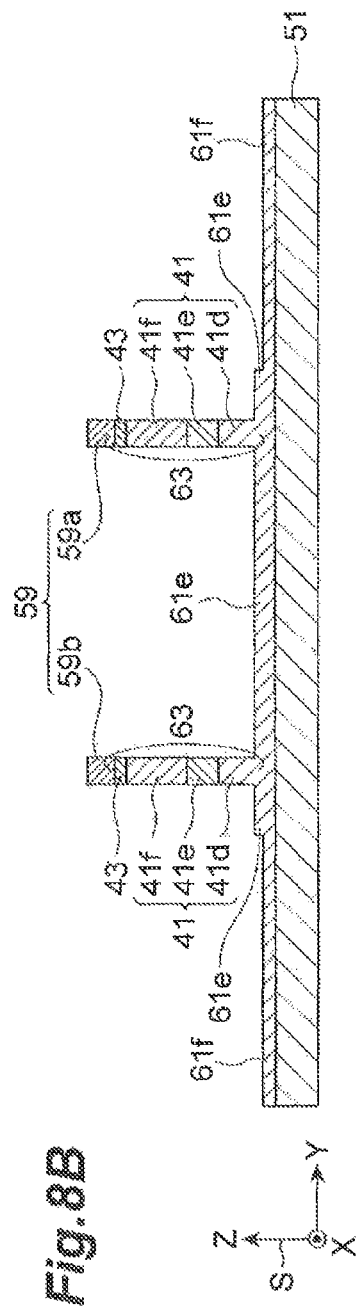
Fig.8A
Fig.8B

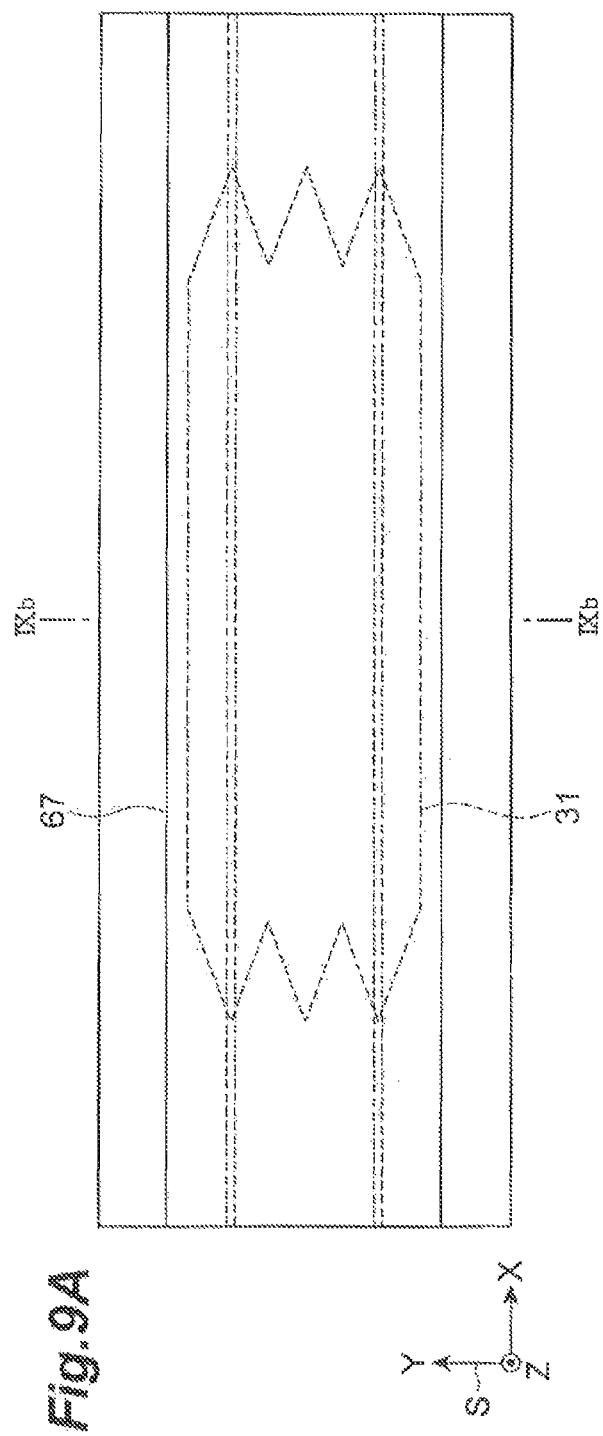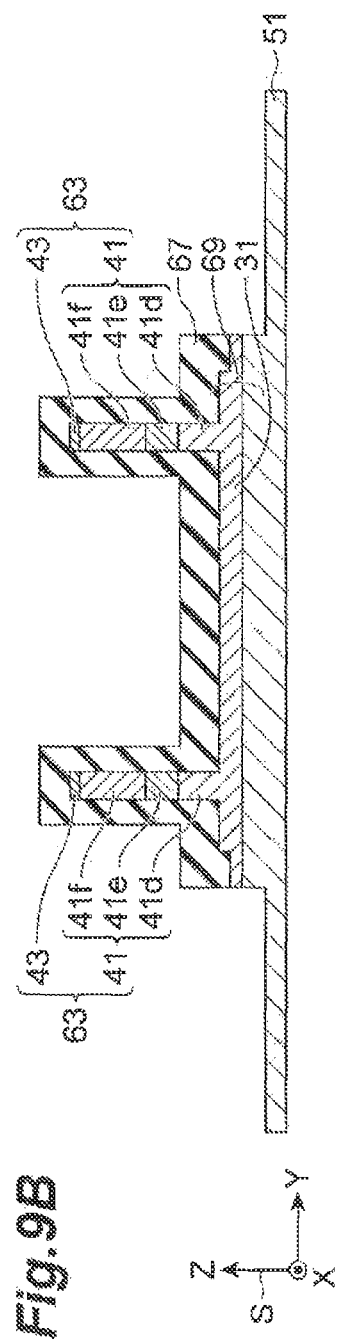

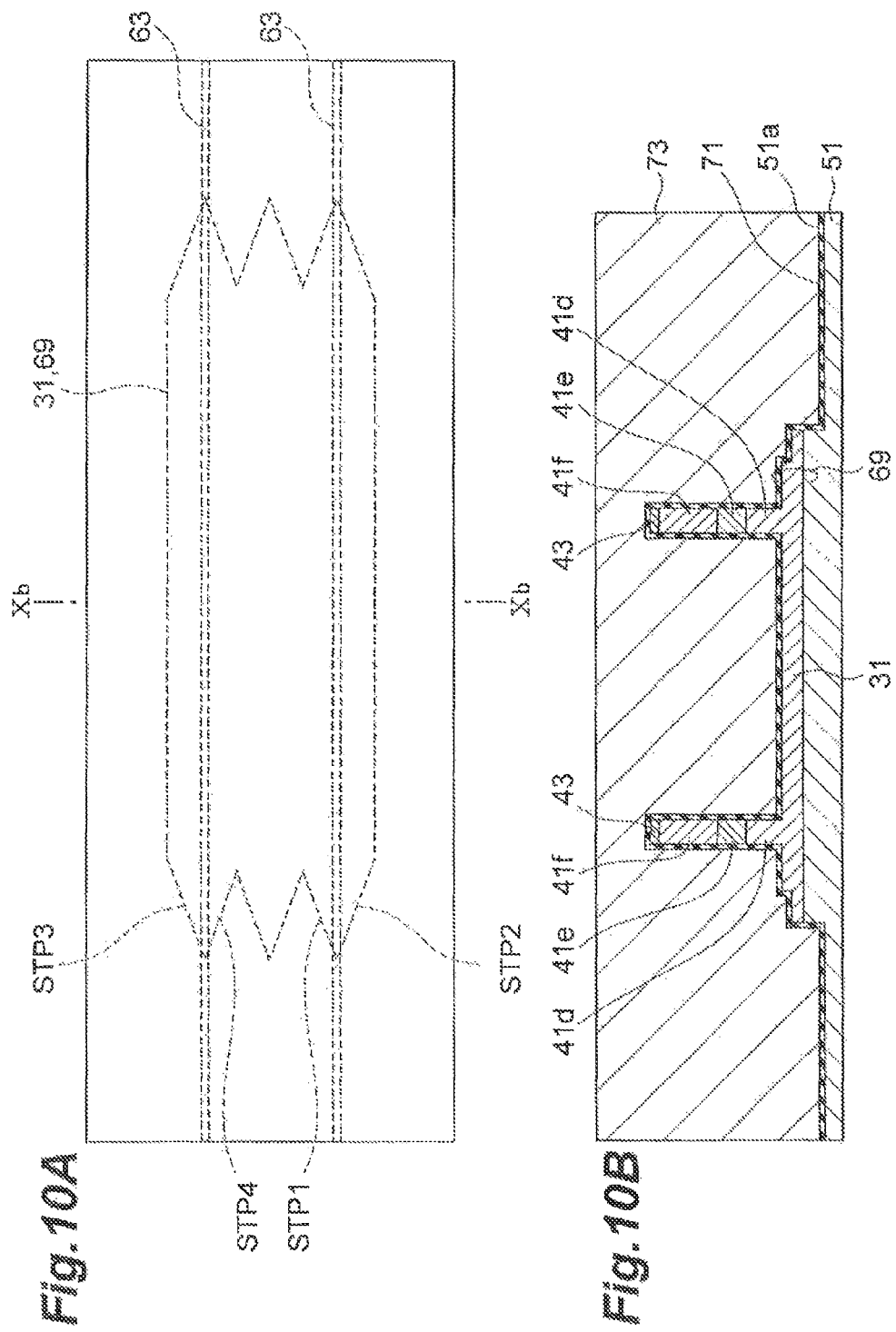

MACH-ZEHNDER MODULATOR, METHOD OF MAKING OPTICAL WAVEGUIDE STRUCTURE

BACKGROUND OF THE INVENTION

Field of the Invention

The present invention relates to a Mach-Zehnder modulator, and a methods of making an optical waveguide structure Related Background Art Japanese Patent Application Laid Open No. 2006-065085 publication discloses a Mach-Zehnder modulator.

SUMMARY OF THE INVENTION

The Mach-Zehnder modulator in Japanese Patent Application Laid Open No. 2006-065085 publication includes a contact layer, which is provided on a semiconductor mesa for the waveguide thereof, and the contact layer has an edge located on the top of the semiconductor mesa. In the fabrication of the Mach-Zehnder modulator, the contact layer on the semiconductor mesa is processed to remove a part of the contact layer, and the semiconductor mesa and the processed contact layer are buried by growing a burying layer thereon. The burying layer and the buried semiconductor mesa form a waveguide. Such a method of forming a buried semiconductor mesa makes the fabrication of the Mach-Zehnder modulator cumbersome and complicated.

The Mach-Zehnder modulator includes an arm waveguide and an electrode, and the electrode is used for applying a voltage for optical modulation to the arm waveguide. The uppermost layer of the arm waveguide is provided with the contact layer, which is in contact with the electrode. The contact layer is doped with acceptor, and the doping can produce carriers allowing a desired electrical contact with the electrode. Acceptor in the doped contact layer absorbs light propagating in the optical waveguide, and accordingly an unnecessary part of the contact layer should be removed.

Research conducted by the inventors reveals that the method of fabricating an optical waveguide, which allows partial removal of the contact layer, performs the following steps. A semiconductor laminate comprising a contact layer is formed on the substrate. Prior to the formation of a semiconductor mesa for the optical waveguide, the contact layer in the semiconductor laminate is partially removed by etching the semiconductor laminate, and the remaining semiconductor laminate is etched to form the semiconductor mesa, thereby forming a pre-etched contact layer in the semiconductor mesa. However, additional research conducted by the inventors also reveals that the planar shape of the semiconductor regions formed by etching of the remaining semiconductor laminate is different from the expected one. The semiconductor region thus formed includes, for example, the contact layer with an edge extending in a direction perpendicular to the longitudinal direction of the semiconductor mesa for an optical waveguide, and further includes protruding semiconductor walls extending from both ends of the edge of the contact layer in the direction perpendicular to the longitudinal direction. The undesired semiconductor walls are left around the respective ends of the edge of the pre-etched contact layer in the semiconductor mesa. The semiconductor walls may increase the scatter of light propagating in the optical waveguide of the Mach-Zehnder modulator and degrade the modulation performance of the Mach-Zehnder modulator. What is needed is to provide a Mach-Zehnder modulator with no protruding semiconductor and that the Mach-Zehnder modulator does not include any contact layer in one area where it is unwanted and includes the contact layer in another area where it is desired.

It is an object for one aspect of the present invention to provide a Mach-Zehnder modulator, which allows excellent electrical contact with the optical waveguide; reduces unwanted light absorption caused by the contact layer; and avoids optical scattering caused by the unwanted protruding semiconductor structure. It is an object for another aspect of the present invention to provide a method for making an optical waveguide structure which can avoid optical scattering caused by the unwanted protruding semiconductor.

A Mach-Zehnder modulator according to one aspect of the invention comprises: a conductive semiconductor region provided on a primary surface of a substrate; a first semiconductor structure provided on the conductive semiconductor region, the first semiconductor structure including an optical branching coupler and a part of a first arm semiconductor waveguide; a second semiconductor structure provided on the conductive semiconductor region, the second semiconductor structure including a part of the first arm semiconductor waveguide; and a third semiconductor structure provided on the conductive semiconductor region, the third semiconductor structure including a part of the first arm semiconductor waveguide; the primary surface having first to third areas, the first to third areas being arranged sequentially in a waveguide axis, the first to third semiconductor structures being provided on the first to third areas, respectively, the first semiconductor structure including a semiconductor laminate, the semiconductor laminate including a first cladding layer, a core layer and a second cladding layer, the first cladding layer, the core layer and the second cladding layer being arranged in a direction normal to the primary surface of the substrate, the second semiconductor structure including the semiconductor laminate and a first contact portion provided on a top of the semiconductor laminate, the third semiconductor structure including the semiconductor laminate and a second contact portion provided on the top of the semiconductor laminate, the first contact portion and the second contact portion constituting a contact layer, the second semiconductor structure having first and second waveguide sides, the first contact portion of the second semiconductor structure having an edge, the edge terminating the contact layer, the edge extending in a direction of a first reference plane on the top of the semiconductor laminate to reach the first waveguide side, the first reference plane and a top of the second semiconductor structure intersecting with each other to define a line of intersection obliquely-crossed with an upper edge of the first waveguide side at a first angle different from a right angle, and the edge extending in a direction of a second reference plane on the top of the semiconductor laminate to reach the second waveguide side, the second reference plane and the top of the second semiconductor structure intersecting with each other to define a line of intersection obliquely-crossed with an upper edge of the second waveguide side at a second angle different from a right angle.

A method of making an optical waveguide structure according to another aspect of the invention comprises the steps of: preparing a substrate product including a substrate and a semiconductor laminate structure, the semiconductor laminate structure being provided on the substrate and including a semiconductor laminate and a semiconductor layer for a contact layer, and the semiconductor layer being disposed on the semiconductor laminate; forming a first mask on a primary surface of the semiconductor laminate structure; etching the semiconductor laminate structure with the first mask to form a patterned semiconductor layer, the patterned semiconductor layer having first and second edges, and the first and second edges extending from a point on the semiconductor laminate; after the etching, removing the first mask; after the removal of the first mask, forming a second mask on the semiconductor laminate structure and the patterned semiconductor layer, the second mask having a waveguide pattern for a waveguide mesa to be formed, the waveguide pattern having one boundary and another boundary, the first and second edges of the patterned semiconductor layer extending on the semiconductor laminate from a point inside the waveguide pattern to respective outsides of the waveguide pattern, the first edge being obliquely-crossed with the one boundary of the waveguide pattern, and the second edge being obliquely-crossed with the other boundary of the waveguide pattern; and etching the semiconductor laminate structure and the patterned semiconductor layer with the second mask to form the waveguide mesa.

BRIEF DESCRIPTION OF THE DRAWINGS

The above-described objects and the other objects, features, and advantages of the present invention become more apparent from the following detailed description of the preferred embodiments of the present invention proceeding with reference to the attached drawings.

FIGS. 2A and 2B show a semiconductor region including a contact layer in a Mach-Zehnder modulator of the present embodiment, and a semiconductor region comprising a contact layer in a different Mach-Zehnder modulator, respectively.

FIG. 2C illustrates a cross-section taken along the line IIc-IIc shown in FIG. 2A.

FIG. 2D illustrates a cross-section taken along the line IId-IId shown in FIG. 2B.

FIG. 4A is a plan view illustrating a product in a major step in the method for making a Mach-Zehnder modulator.

FIG. 4B is a cross-sectional view illustrating the product in a major in the method.

FIG. 5A is a plan view illustrating a product in a primary steps in the method.

FIG. 5B is a cross-sectional view illustrating the product in a major in the method.

FIG. 6A is a plan view illustrating a product in a major step in the method.

FIG. 6B is a cross-sectional view illustrating a product in a major step in the method.

FIG. 7A is a plan view showing a product in a major step in the method.

FIG. 7B is a cross-sectional view illustrating the product in major step in the method.

FIG. 8A is a plan view illustrating a product in a major step in the method.

FIG. 8B is a cross-sectional view illustrating a product in a major step in the method.

FIG. 9A is a plan view illustrating a product in a major step in the method.

FIG. 9B is a cross-sectional view illustrating the product in a major step in the method.

FIG. 10A is a plan view illustrating a product in a major step in the method.

FIG. 10B is a cross-sectional view illustrating the product in a major step in the method.

DESCRIPTION OF THE PREFERRED EMBODIMENTS

Figure 1:
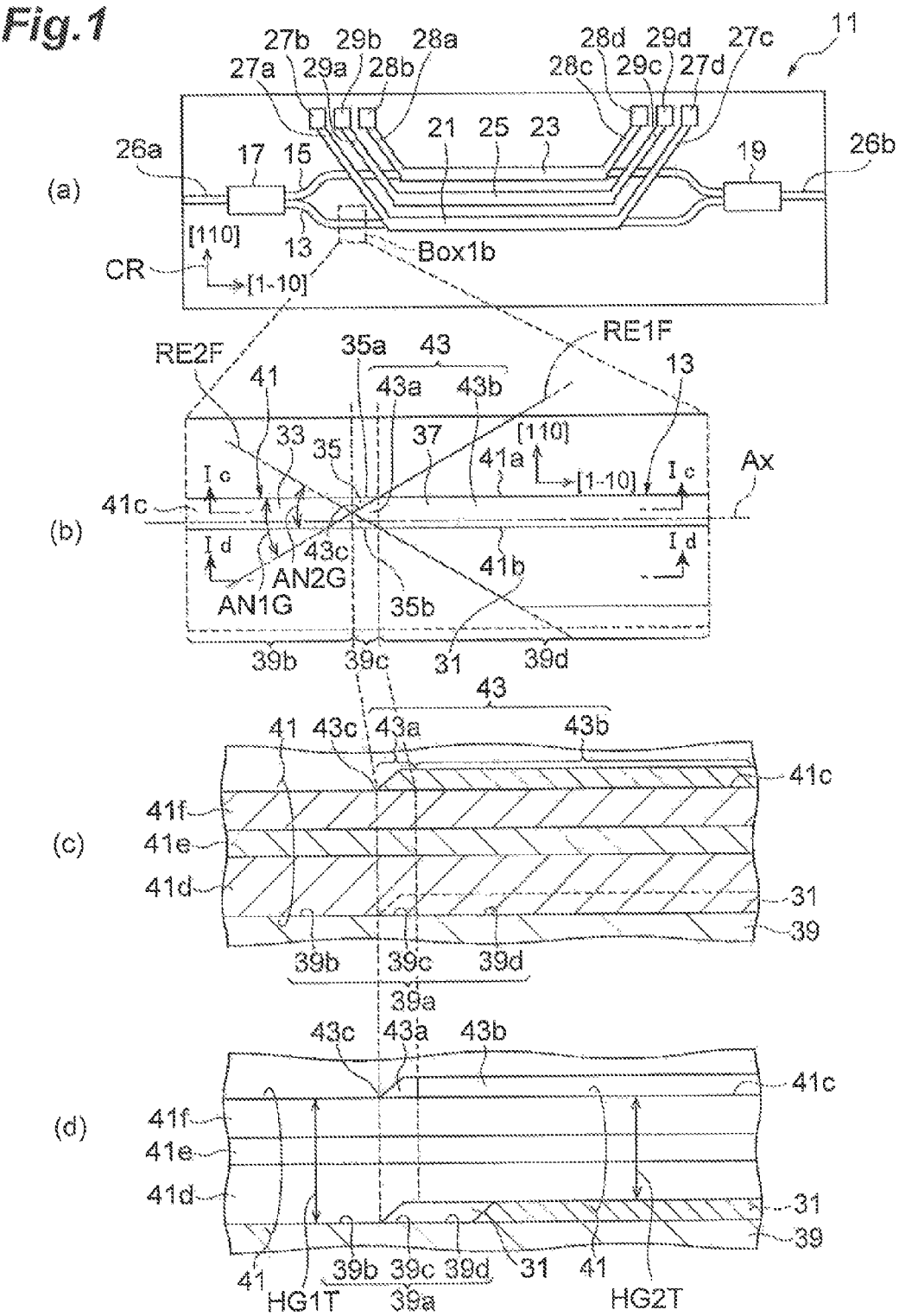
FIG. 1 is a schematic diagram showing a Mach-Zehnder modulator according to an embodiment of the present invention.

Some specific embodiments according to the present above aspects will be described below.

A Mach-Zehnder modulator according to the present embodiment comprises: a conductive semiconductor region provided on a primary surface of a substrate; a first semiconductor structure provided on the conductive semiconductor region, the first semiconductor structure including an optical branching coupler and a part of a first arm semiconductor waveguide; a second semiconductor structure provided on the conductive semiconductor region, the second semiconductor structure including a part of the first arm semiconductor waveguide; and a third semiconductor structure provided on the conductive semiconductor region, the third semiconductor structure including a part of the first arm semiconductor waveguide; the primary surface having first to third areas, the first to third areas being arranged sequentially in a waveguide axis, the first to third semiconductor structures being provided on the first to third areas, respectively, the first semiconductor structure including a semiconductor laminate, the semiconductor laminate including a first cladding layer, a core layer and a second cladding layer, the first cladding layer, the core layer and the second cladding layer being arranged in a direction normal to the primary surface of the substrate, the second semiconductor structure including the semiconductor laminate and a first contact portion provided on a top of the semiconductor laminate, the third semiconductor structure including the semiconductor laminate and a second contact portion provided on the top of the semiconductor laminate, the first contact portion and the second contact portion constituting a contact layer, the second semiconductor structure having first and second waveguide sides, the first contact portion of the second semiconductor structure having an edge, the edge terminating the contact layer, the edge extending in a direction of a first reference plane on the top of the semiconductor laminate to reach the first waveguide side, the first reference plane and a top of the second semiconductor structure intersecting with each other to define a line of intersection obliquely-crossed with an upper edge of the first waveguide side at a first angle different from a right angle, and the edge extending in a direction of a second reference plane on the top of the semiconductor laminate to reach the second waveguide side, the second reference plane and the top of the second semiconductor structure intersecting with each other to define a line of intersection obliquely-crossed with an upper edge of the second waveguide side at a second angle different from a right angle.

The above Mach-Zehnder modulator has the first semiconductor structure that includes a semiconductor laminate and does not include a contact layer, and has the third semiconductor structure that includes a contact layer in addition to the semiconductor laminate. Accordingly, the contact layer on the semiconductor laminate terminates in the second semiconductor structure. The termination forces the contact layer to have an edge which reaches both the first waveguide side and the second waveguide side on the second semiconductor structure. The end of the contact layer extends in the direction of the first reference plane in the vicinity of the first waveguide side to reach the upper edge of the first waveguide side, and extends in the direction of the second reference plane in the vicinity of the second waveguide side to reach the upper edge of the second waveguide side. The first reference plane intersects with the first waveguide side at a first angle different from 90 degrees, and the second reference plane intersects with the second waveguide side at a second angle different from 90 degrees. The contact layer terminates on the top of the semiconductor laminate such that the end of the contact layer has one end and another end, located at the first and second waveguide sides, which are inclined relative to the first and second waveguide sides, respectively. The shape of the edge of the contact layer prevents unwanted semiconductor walls, which may extend from the respective ends of the edge of the contact layer at the first and second waveguide sides, from being formed during the etching for forming the first arm waveguide. This arm waveguide without the unwanted semiconductor walls does not cause any scattering of light propagating through the first arm semiconductor waveguide.

The Mach-Zehnder modulator according to the above embodiment may further comprises a first electrode in contact with the contact layer in the third semiconductor structure.

The Mach-Zehnder modulator allows the first electrode to make a good electrical contact with the contact layer.

In the Mach-Zehnder modulator according to the above embodiment, the contact layer has a thickness of not less than 10 nm and not more than 400 nm.

The Mach-Zehnder modulator allows the contact layer to be provided with a good electrical contact.

The Mach-Zehnder modulator according to the above embodiment further comprises another electrode in contact with the conductive semiconductor region in the third area.

In the Mach-Zehnder modulator, the further electrode can apply a signal to the arm waveguide via a conductive semiconductor region being in contact with the arm waveguide.

In the Mach-Zehnder modulator according to the above embodiment, the first angle is not less than 2.5 degrees.

In the Mach-Zehnder modulator, the lower limit of the first angle can provide the contact layer with the edge of a desired shape stably.

In the Mach-Zehnder modulator according to the above embodiment, the first angle is not more than 60 degrees.

In the Mach-Zehnder modulator, the upper limit of the first angle can provide the contact layer with the edge of desired shape stably.

In the Mach-Zehnder modulator according to the above embodiment, the first semiconductor structure, the second semiconductor structure and the third semiconductor structure further include respective parts of a second arm semiconductor waveguide, the second arm semiconductor waveguide includes another semiconductor laminate, the Mach-Zehnder modulator further comprises first to fourth terraces, the first to fourth terraces are disposed in the second and third areas, the first terrace is obliquely-connected with a bottom edge of the first waveguide side of the first arm semiconductor waveguide, the second terrace is obliquely-connected with a bottom edge of the second waveguide side of the first arm semiconductor waveguide, the third terrace is obliquely-connected with a bottom edge of the first waveguide side of the second arm semiconductor waveguide, and the second terrace is obliquely-connected with a bottom edge of the second waveguide side of the second arm semiconductor waveguide.

In the Mach-Zehnder modulator, the edge of the contact layer extends in the direction of the first reference plane in the vicinity of the first waveguide side to reach the first waveguide side, and extends in the direction of the second reference plane in the vicinity of the second waveguide side of to reach the second waveguide side. The first arm semiconductor waveguide and the second arm semiconductor waveguide, for example, the first arm semiconductor waveguide has first and second sides from which the first and second terraces extend obliquely outward, respectively, so that each of the first and the second arm semiconductor waveguides does not have any unwanted semiconductor walls that may cause the scattering of light propagating therethrough.

In the Mach-Zehnder modulator according to the above embodiment, the first and second terraces extend in the directions of the first and second reference planes, respectively, and the first and fourth terraces connect with each other in the third area to form a notch.

In the Mach-Zehnder modulator, the acute notch, the first terrace, the second terrace, the third terrace and the fourth terrace are provided in the conductive semiconductor region and/or the substrate. The Mach-Zehnder modulator with the acute notch includes no unwanted semiconductor walls, which may scatter light propagating through the first and second arm semiconductor waveguides, and accordingly can avoid optical loss.

In the Mach-Zehnder modulator according to the above embodiment, each of the first and fourth terraces has one or more notches, and the first and fourth terraces connect with each other in the third area to form a protrusion.

In the Mach-Zehnder modulator, the notch formed by the first and fourth terraces allows the first and second arm semiconductor waveguides to have a reduced length.

A method of making an optical waveguide structure according to the present embodiment comprises the steps of: preparing a substrate product including a substrate and a semiconductor laminate structure, the semiconductor laminate structure being provided on the substrate and including a semiconductor laminate and a semiconductor layer for a contact layer, and the semiconductor layer being disposed on the semiconductor laminate; forming a first mask on a primary surface of the semiconductor laminate structure; etching the semiconductor laminate structure with the first mask to form a patterned semiconductor layer, the patterned semiconductor layer having first and second edges, and the first and second edges extending from a point on the semiconductor laminate; after the etching, removing the first mask; after the removal of the first mask, forming a second mask on the semiconductor laminate structure and the patterned semiconductor layer, the second mask having a waveguide pattern for a waveguide mesa to be formed, the waveguide pattern having one boundary and another boundary, the first and second edges of the patterned semiconductor layer extending on the semiconductor laminate from a point inside the waveguide pattern to respective outsides of the waveguide pattern, the first edge being obliquely-crossed with the one boundary of the waveguide pattern, and the second edge being obliquely-crossed with the other boundary of the waveguide pattern; and etching the semiconductor laminate structure and the patterned semiconductor layer with the second mask to form a waveguide mesa.

According to the above fabricating method, the semiconductor layer of the semiconductor laminate (a semiconductor layer for the contact layer) is patterned with the first mask, and the patterned semiconductor layer and the remaining semiconductor laminate are processed with the second mask to form a waveguide mesa. The first mask has a pattern including a first line and a second line both extending outward from a point located on the top of the semiconductor layer for the contact layer in the waveguide region to be formed, and these lines obliquely cross the respective sides of the waveguide region. This mask pattern can form a forward-shaped mesa rather than inverted-shaped mesas at the edge of the semiconductor layer patterned so as to obliquely across the boundary of the waveguide region to be formed. The forwardly mesa-shaped edge of the patterned semiconductor layer prevents the process, which is carried out in the steps of patterning the semiconductor layer to form the waveguide mesa, from producing a structure which provides the second mask with the unexpected pattern. Hence, the second mask does not contain any unwanted patterns leading to the formation of unwanted semiconductor walls.

In the method according to the above embodiment, the optical waveguide structure is contained in a Mach-Zehnder modulator.

The fabricating method is applicable to fabricating a Mach-Zehnder modulator including an edge of the contact layer in the waveguide mesa.

The teachings of the present invention will readily be understood in view of the following detailed description with reference to the accompanying drawings illustrated by way of example. Embodiments of an optical waveguide with an electrode, in particular, a Mach-Zehnder modulator, and a method for fabricating an optical waveguide, in particular, a method of fabricating a Mach-Zehnder modulator will be explain below with reference to the accompanying drawings. When possible, parts identical to each other will be referred to as reference symbols identical to each other.

FIG. 1 is a schematic view showing a Mach-Zehnder modulator according to the present embodiment. The Mach-Zehnder modulator 11 can be integrated with other optical elements to form an integrated device, and may be fabricated to form a single semiconductor device. Referring to part (a) of FIG. 1, the Mach-Zehnder modulator 11 includes a first arm semiconductor waveguide 13, a second arm semiconductor waveguide 15, a first semiconductor branching waveguide 17, a second semiconductor branching waveguide 19, a first electrode 21, a second electrode 23 and a third electrode 25. Referring to part (a) of FIG. 1, the crystal coordinate system CR is depicted. One end of the first arm semiconductor waveguide 13 and one end of the second arm semiconductor waveguide 15 are optically coupled to the respective ports of the first semiconductor branching waveguide 17, and the other end of the first arm semiconductor waveguides 13 and the other end of the second arm semiconductor waveguide 15 are optically coupled to the respective ports of the second semiconductor branching waveguide 19. In the present embodiment, the first semiconductor branching waveguide 17 receives an unmodulated input light beam from an input waveguide 26a. The second branching semiconductor waveguide 19 provides a modulated output light beam to an output waveguide 26b. The first semiconductor branching waveguide 17 and the second branching semiconductor waveguide 19 can include, for example, a multimode interferometer (MMI). The first electrode 21 is provided to modulate the phase of a light beam propagating in the first arm semiconductor waveguide 13, and the second electrode 23 is provided to modulate the phase of light propagating in the second arm semiconductor waveguides 15. The first electrode 21 and the second electrode 23 are in contact with the first-conductive semiconductor layer constituting the upper surface of the first conductive-type semiconductor layer, and the second arm semiconductor waveguides 15 constituting the upper surface of the first arm semiconductor waveguides 13, respectively. In the present embodiment, the first arm semiconductor waveguide 13 and the second arm semiconductor waveguide 15 share with the third electrode 25, which is connected to the second conductive-type semiconductor constituting both the lower semiconductor layer of the first arm semiconductor waveguide 13 and the lower semiconductor layer of the second arm semiconductor waveguide 15. The first electrode 21 is connected to an 11-th pad electrode 27b through the wiring conductor 27a, and is connected to the 12-th pad electrode 27d through the wiring conductor 27c. The second electrode 23 is connected to 21-th pad electrode 28b through the wiring conductor 28a, and is connected to a 22-th pad electrode 28d through the wiring conductor 28c. The third electrode 25 is connected to a 31-th pad electrode 29b through the wiring conductor 29a, and is connected to a 32-th pad electrode 29d through the wiring conductor 29c.

Part (b) of FIG. 1 is a plan view showing a semiconductor region of the area indicated by BOX1b in part (a) of FIG. 1. Part (c) of FIG. 1 is a cross sectional view, taken along the line Ic-Ic shown in part (b) of FIG. 1, showing a semiconductor region. Part (d) of FIG. 1 is a cross sectional view, taken along the Id-Id lines shown in part (b) of FIG. 1, showing a semiconductor region. In order to facilitate the understanding, parts (b), (c) and (d) of FIG. 1 is a diagrammatic view showing the shape of the semiconductor region with the member covering the semiconductor region being omitted in the figures. The Mach-Zehnder modulator 11 includes a conductive semiconductor region 31, a first semiconductor structure 33, a second semiconductor structure 35, and a third semiconductor structure 37. The conductive semiconductor region is disposed on a substrate 39. The first semiconductor structure 33 is disposed on the conductive semiconductor region 31, and includes a part of the first arm semiconductor waveguide 13 and a branching semiconductor waveguide (the first branching semiconductor waveguide 17 in the present example). The second semiconductor structure 35 is disposed on the conductive semiconductor region 31, and includes a part of the first arm semiconductor waveguide 13. The third semiconductor structure 37 is disposed on the conductive semiconductor region 31, and includes a part of the first arm semiconductor waveguide 13. The first arm semiconductor waveguide 13, the second arm semiconductor waveguide 15, the first semiconductor branching waveguide 17, and the second semiconductor branching waveguide 19 include a semiconductor laminate 41. The semiconductor laminate 41 includes a first cladding layer 41d, a core layer 41e, and a second cladding layer 41f. The first cladding layer 41d, the core layer 41e, and the second cladding layer 41f are arranged in the direction of the axis normal to a principal surface 39a.

A substrate 39 provides the principal surface 39a, and the principal surface 39a includes a first area 39b, a second area 39c, and a third area 39d. The first area 39b, the second area 39c, and the third area 39d are arranged in this order in the direction of the propagation axis Ax. The first semiconductor structure 33, the second semiconductor structure 35, and the third semiconductor structure 37 are provided on the first area 39b, the second area 39c, and the third area 39d, respectively. The first semiconductor structure 33 includes a semiconductor laminate 41. The second semiconductor structure 35 includes the semiconductor laminate 41 and the first contact portion 43a, and the first contact portion 43a is provided on the top 41c of the semiconductor laminate 41. The third semiconductor structure 37 includes the semiconductor laminate 41 and the second contact portion 43b, and the second contact portion 43b is provided on the top 41c of the semiconductor laminate 41. The first contact portion 43a and the second contact portion 43b constitute a contact layer 43. The second semiconductor structure 35 includes a first waveguide side 35a and the second waveguide side 35b. The first contact portion 43a of the second semiconductor structure 35 has an edge 43c (at which the contact layer 43 terminates) on the top 41c of the semiconductor laminate 41. The edge 43c extends on the top 41c in the direction of the first reference plane RE1F in the vicinity of the semiconductor laminate 41 of the first waveguide side 35a to reach the first waveguide side 35a. A first intersection line where the first reference plane RE1F and the top of the second semiconductor structure 35 meet is inclined with respect to the upper edge of the first waveguide side 35a at a first angle AN1G different from 90 degrees. The edge 43c extends on the top 41c in the direction of the second reference plane RE2F in the vicinity of the second waveguide side 35b of the semiconductor laminate 41 to reach the second waveguide side 35b. A second intersection line where the upper surface of the second semiconductor structure 35 and the second reference surface RE2F meet is inclined with respect to the upper edge of the second waveguide side 35b at a second angle AN2G different from 90 degrees.

In the Mach-Zehnder modulator 11 according to the present embodiment, the first semiconductor structure 33 includes the semiconductor laminate 41 and does not include the contact layer 43 whereas the third semiconductor structure 37 includes the contact layer 43 in addition to the semiconductor laminate 41, so that the contact layer 43 on the semiconductor laminate 41 is terminated in the second semiconductor structure 35. This termination forces the contact layer 43 to have an edge, which reaches both the first waveguide side 35a and the second waveguide side 35b, located on the second semiconductor structure 35. The edge of the contact layer 43 extends in the direction of the first reference plane RE1F in the vicinity of the first waveguide side 35a to reach the first waveguide side 35a, and extends in the direction of the reference plane RE2F in the vicinity of the second waveguide side 35b to reach the second waveguide side 35b. The first reference plane RE1F intersects with the first waveguide side 35a at a first angle AN1G different from 90 degrees, and the second reference plane RE2F intersects with the second waveguide side 35b at a second angle AN2G different from the 90 degrees.

An exemplary semiconductor region in the Mach-Zehnder modulator 11 is as follows.
Conductive semiconductor region 31: Si-doped n-type InP layer, dopant concentration: $9 \times 10^{17}$ to $5 \times 10^{18}$ cm$^{-3}$, thickness: 500 to 1000 nm.
Substrate 39: semi-insulating (Fe-doped) InP substrate.
First cladding layer 41d: Si-doped n-type InP layer, dopant concentration $5 \times 10^{16}$ to $5 \times 10^{17}$ cm$^{-3}$, thickness: 400 to 900 nm.
Core layer 41e: undoped AlGaInAs/AlInAs multiple quantum well layer.
Second cladding layer 41f: Zn-doped p-type InP layer, dopant concentration: $1 \times 10^{1}$ to $1 \times 10^{18}$ cm$^{-3}$, thickness 500 to 1200 nm.
Contact layer 43: Zn-doped p-type InGaAs layer, dopant concentration: $8 \times 10^{18}$ to $5 \times 10^{19}$ cm$^{-3}$, thickness: 10 nm to 400 nm. A p-type InGaAsP layer may be provided between the second cladding layer 41f and the contact layer 43 to be an intermediate layer.
Waveguide axis Ax: [1-10] axis.

In the present example, the edge 43c of the contact layer 43 is shaped in a forward mesa.

In the present example, the contact layer 43 is in contact with the second cladding layer 41f; and the second cladding layer 41f is in contact with the core layer 41e; the core layer 41e is in contact with the first cladding layer 41d. The above description has been made with reference to the first arm semiconductor waveguide 13, and also applies equally to the second arm semiconductor waveguide 15.

FIGS. 2A and 2B show a semiconductor region including a contact layer of another Mach-Zehnder modulator, and a semiconductor region including a contact layer of the Mach-Zehnder modulator according to the present embodiment, respectively. In FIGS. 2A and 2B, the crystal coordinate system CR representing the orientation of the first and second arm semiconductor waveguides is depicted. FIG. 2A is a plan showing a semiconductor laminate and the edge of a contact layer in an area including both of the first and second arm semiconductor waveguides in the other Mach-Zehnder modulator different from the Mach-Zehnder modulator according to the embodiment, and FIG. 2C shows a cross section taken along the line IIc-IIc shown in FIG. 2A. FIG. 2B is a plan view showing a semiconductor laminate and the edge of a contact layer in an area including both of the first and second arm semiconductor waveguides of the Mach-Zehnder modulator according to the embodiment, and FIG. 2D shows a cross-section taken along the line IId-IId shown in FIG. 2B.

With reference to FIG. 2A, the other Mach-Zehnder modulator will be explained below. The patterned n-type semiconductor region 2 is formed on the semi-insulating substrate 1. The n-type semiconductor region 2 has edges 2a and 2b extending in the directions of [1-10] and [110] axes indicated in the crystal coordinate system CR, respectively. The shape defined by edges 2a and 2b is associated with the shape of the mask for patterning which is applied to a semiconductor layer for the contact layer in the fabricating process in order to terminate the contact layer. The first and second arm waveguides 3 are provided on the semi-insulating substrate 1 and the n-type semiconductor region 2.

An exemplary semiconductor region in the other Mach-Zehnder modulator.
Semi-insulating substrate 1: Fe-doped InP substrate.
n-type semiconductor region 2: Si-doped n-type InP layer.
First cladding layer 8a: Si-doped n-type InP layer.
Core layer 8b: undoped AlGaInAs/AlInAs layer.
The second cladding layer 8c: Zn-doped p-type InP layer.

Contact layer 4: Zn-doped p-type InGaAs layer.
Direction of the waveguide: [1-10] axial direction.
The first cladding layer 8a, the core layer 8b and the second cladding layer 8c are sequentially arranged under the contact layer 4 in the direction of the axis normal to the principal surface of the semi-insulating substrate. A semiconductor wall 7 is provided in alignment with the edge 2b of the n-type semiconductor region 2. As shown in FIG. 2C, the semiconductor wall 7 includes, for example, the first cladding layer 8a, the core layer 8b, the second cladding layer 8c and the contact layer 4, which are arranged sequentially in the direction of the axis normal to the principal surface of the semi-insulating substrate.

Referring to FIG. 2B, the contact layer 43 is terminated on the top 41c of the semiconductor laminate 41 such that the ends 43d and 43e of the edge 43c of the contact layer 43 are inclined to the first waveguide side 35a and the second waveguide side 35b in the vicinity of these waveguide sides, respectively. Forming the contact layer 43 with the above shape can prevent an unwanted semiconductor wall (Semiconductor wall 7 in FIG. 2A), extending in alignment with the ends of the contact layer from the first waveguide side and the second waveguide side, from being formed during the etching in which the first arm semiconductor waveguide 13 and the second arm semiconductor waveguide 15 are to be formed. No scattering of light propagating through the first arm semiconductor waveguide 13 and the second arm semiconductor waveguide 15 occurs due to unwanted semiconductor wall 7.

The first electrode 21 and the second electrode 23 are in contact with the contact layer 43 in the third semiconductor structure 37 on the third area 39d, and the third electrode 25 is in contact with the third area 39d in the conductive semiconductor region 31. In FIG. 2B, a broken line "P21," a broken line "P23" and a broken line "P25" indicate the location of the first electrode 21, the second electrode 23 and the third electrode 25, respectively. The Mach-Zehnder modulator 11 is provided with a good electrical contact because the first electrode 21 and the second electrode 23 are in direct contact with the contact layer 43. The contact layer 43 may have a thickness of 10 nm or more, and 400 nm or less, thereby demonstrating an excellent electrical contact.

Figure 3:
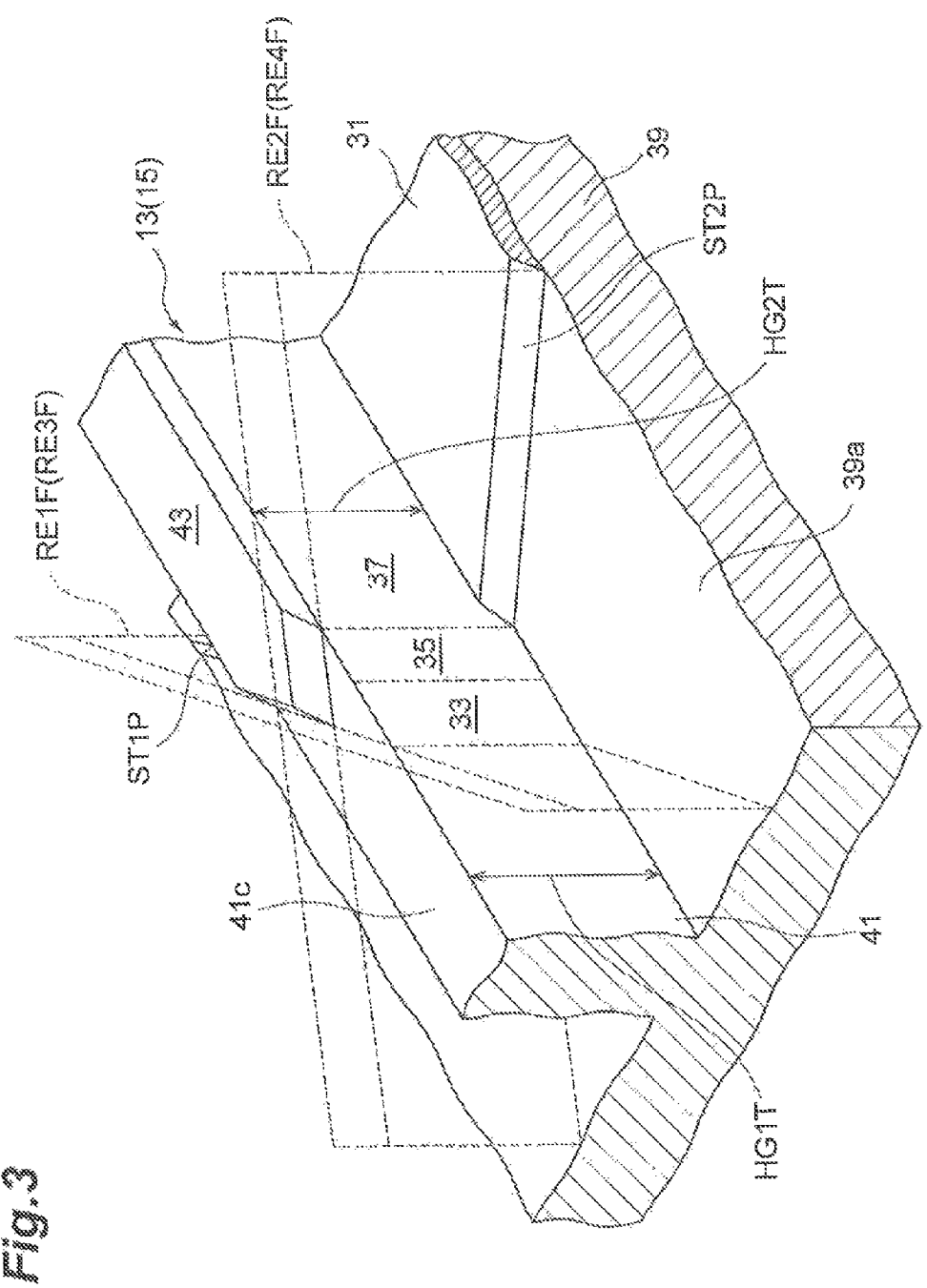
FIG. 3 is a perspective view showing a semiconductor region of the first arm semiconductor waveguides in the Mach-Zehnder modulator according to the present embodiment.

FIG. 3 is a perspective view showing a semiconductor region of the first arm semiconductor waveguide 13 of the Mach-Zehnder modulator according to the present embodiment. As will be understood from the following description on the fabrication method according to the present embodiment, the planar shape of the conductive semiconductor region 31 is associated with the shape of the isolation mesa.

Referring to FIGS. 2B and 3, as is the case with the first arm semiconductor waveguide 13, the first semiconductor structure 33, the second semiconductor structure 35 and the third semiconductor structure 37 for the second arm semiconductor waveguide 15 are disposed in the first area 39b, the second area 39c and the third area 39d, respectively. In the second arm semiconductor waveguide 15, the first semiconductor structure 33 also includes the semiconductor laminate 41 and the first contact portion 43a, and the first contact portion 43a is located on the top 41c of the semiconductor laminate 41. The third semiconductor structure 37 includes the semiconductor laminate 41 and the second contact portion 43b, and the second contact portion 43b is located on the top 41c of the semiconductor laminate 41. The second semiconductor structure 35 (the semiconductor laminate 41) has the first waveguide side 35a (the first side 41a) and the second waveguide side 35b (the second side 41b). The first contact portion 43a of the second semiconductor structure 35 has an edge 43c (where the contact layer 43 terminates). The edge 43c extends in the direction of the third reference plane RE3F on the top 41c of the semiconductor laminate 41 in the vicinity of the first waveguide side 35a to reach the first waveguide side 35a. The third intersection line where the top of the second semiconductor structure 35 and the third reference plane RE3F meet is inclined at a third angle AN3G different from 90 degrees with reference to the upper edge of the first waveguide side 35a. The edge 43c extends in the direction of the fourth reference plane RE4F on the top 41c of the semiconductor laminate 41 in the vicinity of the second waveguide side 35b to reach the second waveguide side 35b. The fourth intersection line where the top of the second semiconductor structure 35 and the fourth reference plane RE4F meet is inclined at a fourth angle AN4G different from 90 degrees with reference to the upper edge of the second waveguide side 35b.

According to the experiments conducted by inventors, the first angle AN1G, the second angle AN2G, the third angle AN3G and the fourth angles AN4G that are different angles from 90 degrees can avoid the formation of undesired semiconductor walls. Specifically, the first angle AN1G is more than one degree and 80 degrees or less, or 100 degrees or more and 179 degrees or less. The second angle AN2G is one degree or more and 80 degrees or less, or 100 degrees or more and 179 degrees or less.

Furthermore, in order to avoid the formation of undesired semiconductor walls and the uneven side of the waveguide mesa, each of the first angle AN1G, the second angle AN2G, the third angular AN3G and the fourth angular AN4G is an acute angle. Specifically, the first angle AN1G may be not less than one degree and not more than 80 degrees. The second angle AN2G can be not less than one degree and not more than 80 degrees. This angular range can make it possible to form the less rough side of the semiconductor laminate for the arm waveguides and to reduce the optical scattering arising from the roughness. The morphology of the roughness has, for example, recesses irregularly jagged and agnail-shaped.

Further, the first angle AN1G, the second angle AN2G, the third angular AN3G and the fourth angular AN4G is preferably 2.5 degrees or more and 60 degrees or less. The angle of not less than 2.5 degrees allows the edge 43c of the contact layer 43 to have a desired shape stably. Each of the first angle AN1G, the second angle AN2G, the third angular AN3G and the fourth angular AN4G is preferably 60 degrees or less. The angle of not less than 60 degrees allows the edge 43c of the contact layer 43 to have a desired shape stably.

As shown in FIG. 2B, the first semiconductor structure 33 further comprises a part of the second arm semiconductor waveguide 15, the second semiconductor structure 35 further comprises a part of the second arm semiconductor waveguide 15, and the third semiconductor structure 37 further comprises a part of the second arm semiconductor waveguide 15. In the first arm semiconductor waveguide 13, the conductive semiconductor region 31 has a first terrace ST1P extending from the bottom of the first waveguide side 35a in the direction of the first reference plane RE1F, and a second terrace ST2P extending from the bottom of the second waveguide side 35b in the direction of the second reference plane RE2F. In the second arm semiconductor waveguide 15, the conductive semiconductor region 31 has a third terrace ST3P extending from the bottom of the first waveguide side 35a in the direction of the third reference plane RE3F, and a fourth terrace ST4P extending from the bottom of the second waveguide side 35b in the direction the fourth reference plane RE4F. As shown in FIG. 2D, the thickness of the conductive semiconductor region 31 is changed at the first terrace ST1P, second terrace ST2P, the third terrace ST3P and fourth terrace ST4P.

The conductive semiconductor region 31 has a connecting portion 31a which extends from one of the first arm semiconductor waveguide 13 and the second arms semiconductor waveguide 15 to the other in the third semiconductor structure 37. At the first terrace ST1P, the second terrace ST2P, the third terrace ST3P and the fourth terrace ST4P, the thickness of the conductive semiconductor region 31 changes or the conductive semiconductor region 31 terminates. Specifically, the connection portion 31a of the conductive semiconductor region has a thickness greater than that of the conductive semiconductor region in the vicinity of the branching semiconductor waveguide and the first semiconductor structure 33. The thick conductive semiconductor region 31 can provide the bridge region with a low electrical resistance that is located between the first and second arm semiconductor waveguides 13, 15 and the third electrode 25.

As shown in part (d) of FIG. 1, the first height HG1T of the semiconductor laminate 41 in the first semiconductor structure 33 is greater than the second height HG2T of the semiconductor laminate 41 in the third semiconductor structure 37. This difference in height is nearly equal to the thickness of the contact layer 43.

The Mach-Zehnder modulator 11, which has the first semiconductor structure 33 having the semiconductor laminate 41 of the first height HG1T greater than the second height HG2T of the semiconductor laminate 41 in the third semiconductor structure 37, allows the first semiconductor structure 33 to have an excellent optical confinement performance. Hence, a large height of the mesa-shaped semiconductor laminate 41 provides an advantage in optical confinement to the first arm semiconductor waveguide 13 (the second arm semiconductor waveguide 15) and the first branch semiconductor waveguide 17 (the second branch semiconductor waveguide 19) in the first semiconductor structure 33 without light absorption caused by the contact layer 43. Furthermore, the contact layer 43 in the first arm semiconductor waveguide 13 (and the second arm semiconductor waveguide 15) of the third semiconductor structure 37 provides a good electrical performance. The first arm semiconductor waveguide 13 (and the second arm semiconductor waveguide 15) in the second semiconductor structure 35 has an advantage of avoiding the formation of undesired protruding semiconductor wall 7.

With reference to FIGS. 4A to 11B, the embodiment of the method for fabricating an optical waveguide structure with an electrode, particularly a Mach-Zehnder modulator, will be described below. The method prepares a semi-insulating InP substrate 51. As shown in FIGS. 4A and 4B, a semiconductor laminate 53 for optical waveguides of the Mach-Zehnder modulator is grown on the InP primary surface 51a of the InP substrate 51. The semiconductor stack 53 includes a first semiconductor layer 53a for a Si-doped n-type InP cladding layer, a second semiconductor layer 53b for the core layer of undoped AlGaInAs/AlInAs multiple quantum well structure, a third semiconductor layer 53c for a Zn-doped p-type InP, and a fourth semiconductor layer 53d for a Zn-doped p-type contact layer. The growth of these semiconductor layers is carried out, for example, by metal organic vapor phase epitaxy. Referring to FIGS. 4A and 4B, an orthogonal coordinate system S is depicted. The thickness of the fourth semiconductor layer 53d may be, for example, 0.25 micrometers. The thickness of the fourth semiconductor layer 53d is in the range of 0.01 to 0.4 micrometer, and the dopant concentration of the fourth semiconductor layer 53d may be in a range of $8\times10^{18}$ to $5\times10^{19}$ cm$^{-3}$. In the present embodiment of the first semiconductor layer 53a, the second semiconductor layer 53b, the third semiconductor layer 53c and the fourth semiconductor layers 53d are arranged in the direction of the Z axis. The InP primary surface 51a of the InP substrate 51 is parallel to the plane defined by the X-axis and Y-axis. In the present embodiment, the X-axis is oriented in the [1-10] direction of the InP substrate, and the Y-axis is oriented in the [110] direction of the InP substrate.

To ensure that the waveguide in the desired region does not contain any p-type contact layer, the fourth semiconductor layer 53d for the p-type contact layer is preliminary patterned. FIG. 5A is a plan view showing the area where the first and second arm waveguides are to be produced in a single device section in the primary surface of the epitaxial substrate including the InP substrate 51 and the semiconductor stack 53, and FIG. 5B is a cross-sectional view taken along line Vb-Vb shown in FIG. 5A. The relevant portions of the first and second arm waveguides in the area shown in FIG. 5A is fabricated so as to extend in the direction of, for example, the [1-10] axis of the InP substrate, and this direction determines the orientation of the pattern of the first mask 55.

A first mask 55 is formed on the primary surface 53f of the semiconductor laminate 53. In the present embodiment, the first mask 55 is formed from a silicon-based inorganic insulating layer by photo lithography and dry etching (using CF$_4$-based gas). The time for the dry etching is determined so as to perform over-etching of not less than 30% of the time for which a silicon-based inorganic insulating layer of the film thickness can be etched completely. The first waveguide region D13 and the second waveguide region D15 shown in FIG. 5A indicate the respective positions where the first arm semiconductor waveguide 13 and the second arm semiconductor waveguide 15 are to be formed. In the subsequent description, the step of preparing a first arm semiconductor waveguide 13 will be described, and the description also applies to the second arm semiconductor waveguide 15. The InP primary surface 51a includes an 11-th areas 51b, a 12-th area 51c, a 13-th area 51d, a 22-th area 51e (which is equivalent to the 12-th area 51c in this example, and is referred to as "the 12-th area 51c"), and a 21-th area 51f (which is equivalent to the 11-th area 51b in the embodiment, and is referred to as "the 11-th area 51b"), which are arranged in the direction of the X-axis (e.g., the waveguide axis Ax).

The first waveguide region D13 is represented as an 1-th broken line D13a and a 12-th broken line D13b which correspond to the first side 41a (the first waveguide side 35a) and the second side 41b (the second waveguide side 35b) of the semiconductor laminate 41 in the first arm semiconductor waveguide 13, respectively.

The first mask 55 has a first line 55a and a second line 55b, and the first line 55a and the second line 55b meet with each other at the vertex 55c. In the first mask 55, the vertex 55c is located in the first waveguide region D13 and the 12-th area 51c. The first line 55a intersects with the 11-th broken line D13a at a first angle AN1G (see FIG. 2B), and the second line 55b intersects with the 12-th broken line D13b at a second angular AN2G (see FIG. 2B). The first mask 55 does not have any pattern in the 11-th area 51b. The first line 55a and the second line 55b which define a pattern of the first mask 55 are located in the 12-th area 51c, and the first line 55a and the second line 55b of the 13-th area 51d run outside the waveguide region D13.

The first mask 55 has a third line 55d and a fourth line 55e, and in the first mask 55, the third line 55d and the fourth line 55e meet with each other at the vertex 55f. The vertex 55f is located in the second waveguide region D15 and the 12-th area 51c. The third line 55d intersects with the 21-th broken lines D15a at a third angle AN3G (see FIG. 2B), and the fourth line 55e intersects with the 22-th broken line D15b at a fourth angle AN4G (see FIG. 2B). The first mask 55 does not have any pattern in the 11-th area 51b. The third line 55d and the fourth line 55e which define a pattern of the first mask 55 is located in the 12th area 51c, and the third line 55d and the fourth line 55e extends outside the second waveguide region D15 in the 13-th area 51d.

In the present embodiment, the first line 55a and the fourth line 55e are not connected to each other in the 13-th area 51d, and are connected to each other, for example, via the fifth line 55g and the sixth line 55h of the first mask 55. The fifth line 55g and the sixth line 55h are connected to each other at the vertex 55i. The first line 55a is connected to the fifth line 55g at the vertex 55j, and the fourth line 55e is connected to the sixth line 55h at the vertex 55k.

The first line 55a and the second line 55b meet at the vertex 55c to form a first projection PJ1, and the third line 55d and the fourth line 55e meet at the vertex 55f to form a second projection PJ2, and the fifth line 55g and the sixth line 55h meet at the vertex 55i to form a third projection PJ3. The first projection PJ1, the second projection PJ2 and third projection PJ3 are oriented in the same direction. The first line 55a and the fifth line 55g meet at the vertex 55j to form a fourth reverse projection PJ4 (notch), and the fourth line 55e and the sixth line 55h meet at the vertex 55k to form to the fifth reverse projection PJ5 (notch). The direction of the fourth reverse projection PJ4 and the fifth reverse projection PJ5, the first projection PJ1 is oriented opposite to the direction of the second projection PJ2 and the third projection PJ3. Forming the third projection PJ3, the fourth reverse projections PJ4 and the fifth reverse projection PJ5 prevents the first line 55a and the fourth line 55e from forming a deep wedge between the first waveguide region D13 and the second waveguide region D15. The deep wedge results in increase in the length of the arm waveguides in view of providing the electrode between the two arm waveguides with a desired length.

In the first mask 55, the first line 55a and the second line 55b intersects with the 11-th broken line D13a and the 12-th broken line D13b at the first angle AN1G and the second angle AN2G (see FIG. 1), respectively. These angles are defined relative to the 11-th broken line D13a and the 12-th broken line D13b in the embodiment, and the 11-th broken lines D13a and the 12-th broken D13b are oriented in, for example, the [1-10] direction of the InP substrate. The first angle AN1G and the second angle AN2G are not zero degrees, and not 90 degrees. The angular relationship should be satisfied in the first mask 55 having edges which forms respective angles with the upper edges of the mesa sides of the waveguide. In the etching for forming the mesa of the arm waveguides, preliminarily patterning the fourth semiconductor layer 53d for the contact layer with the first mask 55 that satisfies the above relationship can avoid the formation of unwanted semiconductor walls extending from the mesa. The relationship does not request that the first line 55a and the second line 55b directly meet at the vertex 55c to form the first projection PJ1, and the fifth line 55g and the sixth line 55h may be coupled through one or more other lines. In order to form the third projection PJ3, the fifth line 55g and the sixth line 55h may not directly meet at the vertex 55c and the fifth line 55g and the sixth line 55h may be coupled through one or more other line segments. The first line 55a and the second line 55b may be connected with each other to form a single line segment.

The fourth semiconductor layer 53d is selectively etched with the first mask 55 using, for example, a mixed solution of sulfuric acid/hydrogen peroxide and water as an etchant, and preliminarily processing the fourth semiconductor layer 53d forms a semiconductor layer 57, and the surface of the third semiconductor layer 53c is partially exposed.

The semiconductor layer 57 has edges corresponding to the lines of the first mask 55. Specifically, the semiconductor layer 57 has the first edge 57a, the second edge 57b, the third edge 57d and the fourth edge 57e which correspond to the first line 55a, the second line 55b, the third line 55d and the fourth line 55e, respectively. The first line 55a and the second line 55b intersect with the 11-th broken D13a and the 12-th broken D13b at the first angle AN1G and the second angle AN2G (see FIG. 1), respectively, so that the first edge 57a and the second edge 57b are shaped in a forward mesa in the vicinity of the 11-th broken lines D13a and the 12-th broken D13b, respectively. The third line 55d and the fourth line 55e intersect with the 21-th broken line D15a and the 22-th broken line D15b at the third angle AN3G and fourth angle AN4G (see FIG. 2B), respectively, and the third edge 57d and the fourth edge 57e are shaped in a forward mesa in the vicinity of the 21-th broken line D15a and the 22-th broken line D15b. In a manufacturing process of the Mach-Zehnder modulator 11 of the present embodiment, after the etching, the first mask 55 is removed using, for example, a buffered hydrofluoric acid.

FIG. 6A is a plan view illustrating a pattern of a mask for the waveguide formation of the first and second arm waveguides, which is to be carried out after forming a semiconductor layer for the contact layer has been preliminarily patterned, in the area with a single die size on the primary surface of the substrate, and FIG. 6B is a cross sectional view taken along line VIb-VIb shown in FIG. 6A. After removing the first mask 55, a second mask 59 is formed for forming semiconductor mesas for arm waveguides. In the embodiment, the silicon-based inorganic insulating film is grown by CVD and photolithography and dry etching is applied to the silicon-based inorganic insulating film layer to form the second mask 59. Referring to FIGS. 6A and 6B, the second mask 59 comprises a first waveguide pattern 59a for a second arm waveguide and a second waveguide pattern 59b for the first arm waveguide. The first waveguide pattern 59a passes over the first end portion 57c of the semiconductor layer 57 so as to cover the first end portion 57c, the 11-th edge 59aa of the first waveguide pattern 59a intersects with the first edge 57a of the semiconductor layer 57 at the first line of intersection CR1, and the 12-th edge 59ab of the first waveguide pattern 59a intersects with the second edge 57b of the semiconductor layer 57 at the second line of intersection CR2. The 11-th edge 59aa of the first waveguide pattern 59a may form the first angle AN1G with the first edge 57a of the semiconductor layer 57, and the second 12 edge 59ab of the first waveguide pattern 59a forms the second angle AN2G with the edge 57b of the second semiconductor layer 57. The second waveguide pattern 59b passes over the second end portion 57f of the semiconductor layer 57 so as to cover the second end portion 57f, and the 21-th edge 59ba of the second waveguide pattern 59b intersects with the third edge 57d of the semiconductor layer 57 at the third line of intersection CR3; and the 22-th edge 59bb of the second waveguide pattern 59b intersects with the fourth edge 57e of the semiconductor layer 57 at the fourth line of intersection CR4. The 21-th edge 59ba of the second waveguide pattern 59b forms the third angle AN3G with the third edge 57d of the semiconductor layer 57, and the second 22 edge 59bb of the second waveguide pattern 59b forms a fourth angle AN4G with the fourth edge 57e of the semiconductor layer 57. An angle between the side of the semiconductor layer 57 for the contact layer and the surface of the third semiconductor layer 53c that is exposed by the selective etching of the fourth semiconductor layer 53d (an angle defined in a cross section, taken along a plane parallel to the XZ plane, which intersects with the second edge 57b) is, for example, 60 degrees.

The semiconductor layer 57 is not formed in the 11-th area 51b, lies under the first waveguide pattern 59a and the second waveguide pattern 59b in the 12-th area 51c, and appears in the 13-th area 51d without being covered with the first waveguide pattern 59a and the second waveguide pattern 59b.

FIG. 7A is a plan view showing an area, including the first and second arm waveguides, of a single die size in the optional step, and FIG. 7B is a cross-sectional view taken along VIIb-VIIb line in FIG. 7A. In the present embodiment, the waveguides are directed to the [1-10] axial direction, and the semiconductor layer for the contact layer is preliminary patterned such that the edge of the semiconductor layer for the contact layer is inclined with respect to the [1-10] axial direction (the direction in which the sides of the waveguide mesa extends). The pattered semiconductor layer may have an inverted mesa in the vicinity of the fourth reverse projection PJ4 and the fifth inverse projection PJ5 shown in FIGS. 5A and 5B. Silicon-based inorganic insulating material for the second mask 59 may remain under the inverted mesa to form residual material. If necessary, in order to remove the residual material, a resist mask 65 may be formed prior to the etching for forming the waveguide mesa. Etching with this resist mask 65 allows the removal of portions, which are around the fourth reverse protrusion PJ4 and the fifth inverse projection PJ5, of the semiconductor layer 57. The resist mask 65 has a first opening 65a and a second opening 65b in an area including the fourth reverse projection PJ4 and an area including the fifth reverse projection PJ5, respectively. The silicon-based inorganic insulating material left thereunder can be removed with the resist mask 65 by an etchant, such as buffered hydrogen fluoride. The fabricating process to which the above-described optional steps are not applied will be described below.

FIG. 8A is a plan view showing a waveguide mesa, formed by etching, for the first and second arm waveguides, in a part of a section for a single die on the primary surface of the substrate, and FIG. 8B is a cross-sectional view taken along the VIIIb-VIIIb line shown in FIG. 8A. The remaining semiconductor layers (53a, 53b, 53c) and the semiconductor layer 57 for the contact layer which has been preliminarily patterned are etched with the second mask 59 to form the waveguide mesa 63. This etching is performed using an etchant, such as a halogen-based gas.

As shown in FIG. 8A, the first 11-th area 51b does not include any preliminary-patterned semiconductor layer 57, so that a thin-film semiconductor region 61f and the waveguide mesa 63 of the semiconductor laminate 41 are formed. The thin-film semiconductor region 61f is made of the same material as the conductive semiconductor region 31. The waveguide mesa 63 is provided with the semiconductor laminate 41 and is not provided with the contact layer 43. The preliminary-patterned semiconductor layer 57 is located beneath the second mask 59 in the 12-th area 51c, so that the waveguide mesa 63, which includes the semiconductor laminate 41 and a contact layer 43 located thereon, and the thin-film semiconductor region 61f are formed in the 12-th area 51c. The contact layer 43 is terminated on the upper surface of the waveguide mesa 63. In the 13-th area 51d, the waveguide mesa 63 which includes the semiconductor laminate 41 and the contact layer 43 (a laminate comprising the semiconductor laminate 41 and the contact layer 43 located thereon) is formed in the area that the second mask 59 covers, the thick semiconductor region 61e is formed in the area where a preliminary-patterned semiconductor layer 57 is located, and further the thin-film semiconductor region 61f is formed in the area where the preliminary-patterned semiconductor layer 57 is not located. The mesa etching forms a Si-doped first cladding layer 41d from the first semiconductor layer 53a of the n-type InP layer, a core layer 41e from a second semiconductor layer 53b for the core layer of undoped AlGaInAs/AlInAs multiple quantum well structure, and a second cladding layer 41f from the third semiconductor layer 53c of the Zn-doped p-type InP layer. The first cladding layer 41d, the core layer 41e and the second cladding layer 41f are arranged in the direction of the axis normal to the InP primary surface 51a of the InP substrate 51. After the dry etching to form the waveguide mesa, the second mask 59 is removed.

FIG. 9A is a plan view showing the step of forming an isolation mesa, and shows a region including the first and second arm waveguides in a single die size on the primary surface of the substrate. FIG. 9B is a cross-sectional view taken along the IXb-IXb line in FIG. 9A. As shown in FIGS. 9A and 9B, after removing the second mask 59, a third mask 67 which defines the shape of the isolation mesa 69 is formed. The third mask 67 covers an area where a conductive semiconductor region 31 is to be formed in the InP primary surface 51a of the InP substrate 51. In the embodiment, the third mask 67 includes a resist mask. With the third mask 67, the anisotropic dry etching of the thick semiconductor regions 61e and the thin semiconductor region 61f on the InP primary surface 51a of the InP substrate 51 is carried out to form the isolation mesa 69. The etching depth in this process is, for example, about 0.8 μm. After the etching, the InP substrate 51 is exposed in the area that the third mask 67 does not cover. Further, the etching transfers the shape of the overlying stepped semiconductor region, formed by patterning the underlying semiconductor region in the shape of the preliminary-etched contact layer, to the InP substrate 51 to form the stepped surface in the InP substrate 51. This process forms a forward mesa shape coming from a forward mesa shape of the stepped semiconductor region of the substrate. Meanwhile, the edge of the conductive semiconductor region 31, i.e. the boundary of the isolation mesa 69, has a substantially vertical shape sheerer than the forward mesa shape in the stepped portion. After forming the isolation mesa 69, the third mask 67 is removed.

FIG. 10A is a plan view showing a step of forming a resin film, and shows a region including the first and second arm waveguides in a segment of a single die size in the primary surface of the substrate. FIG. 10B is a sectional view taken along line Xb-Xb in FIG. 10A. After forming the isolation mesa 69, as shown in FIGS. 10A and 10B, a protective film 71 is grown over the surface of the InP substrate 51. The protective film 71 is made of, for example, a silicon-based inorganic insulating layer, in particular, silicon oxide film (specifically $SiO_2$). After forming the protective film 71, a resin 73 is applied so as to bury the waveguide mesa on the surface of the InP substrate 51. The resin 73 includes, for example, benzocyclobutene (BCB) based resin.

Figures 11A, 11B:
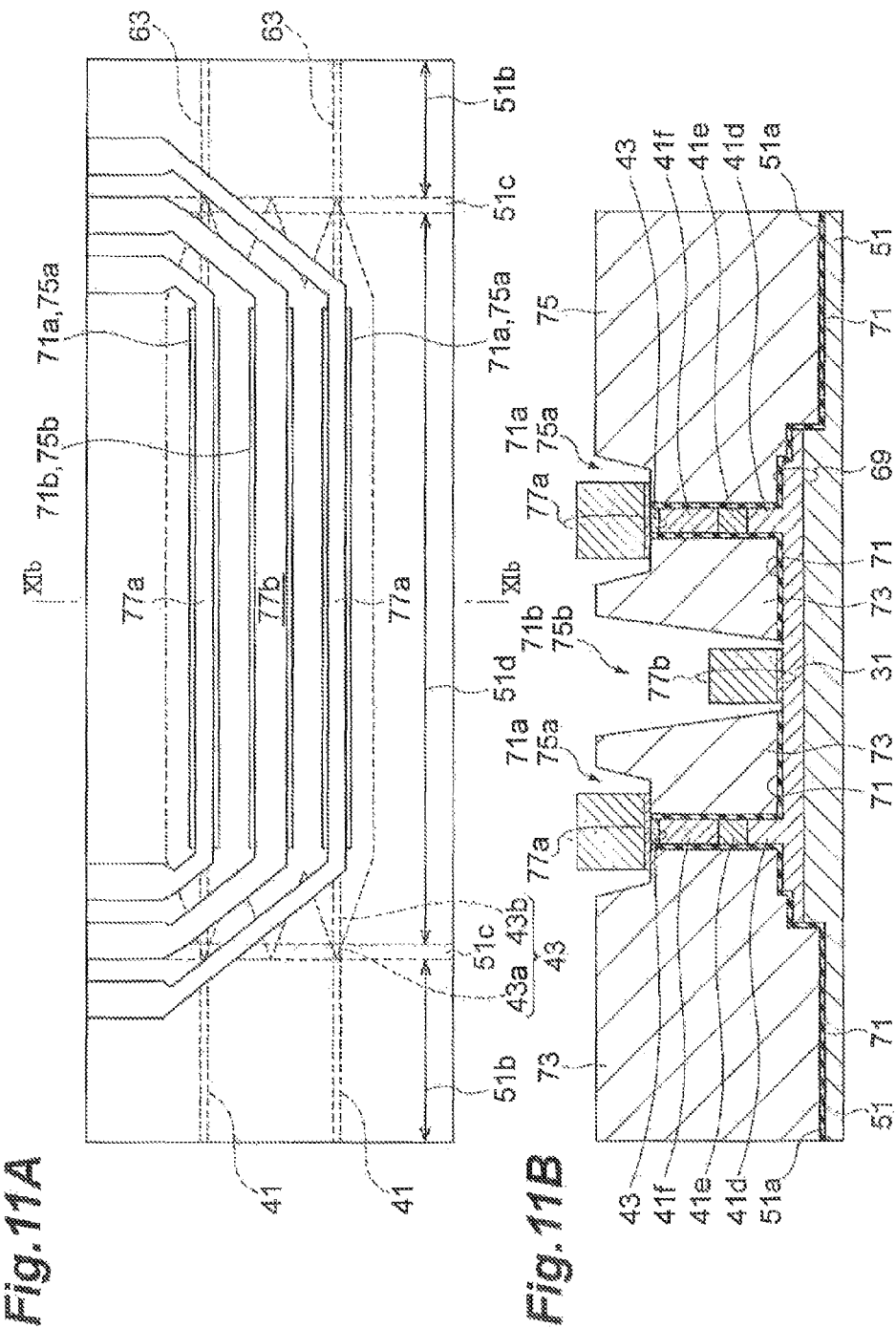
FIG. 11A is a plan view illustrating a product in a major step in the method.
FIG. 11B is a cross-sectional view illustrating a product in a major step in the method.

FIG. 11A is a plan view showing a step of forming an electrode, and shows a region including the first and second arm waveguides in a segment of a single die size on the primary surface of the substrate. FIG. 11B is a sectional view taken along the XIb-XIb line in FIG. 11A. The resin 73 is processed to form the resin body 75 having the first opening 75a for the anode electrode and the second opening 75b for the cathode electrode. The first opening 75a of the resin body 75 is located on the top surface of the waveguide mesa 63 in the 13-th area 51d. The second opening 75b of the resin body 75 is located on the isolation mesa 69 in the 13-th area 51d. After forming the first opening 75a and the second opening 75b, the protective film 71 is etched to form the first insulating opening 71a in the insulating layer, and the second insulating opening 71b in the insulating film. The contact layer 43 is exposed at the first insulating opening 71a and the first opening 75a, and the conductive semiconductor region 31 is exposed at the second insulating opening 71b and the second opening 75b. A first electrode 77a is formed in contact with the contact layer 43 through the first opening 75a, and a second electrode 77b is formed in contact with the conductive semiconductor region 31 through the second opening 75b.

The above processes complete the fabrication of the Mach-Zehnder modulator 11. The Mach-Zehnder modulator 11 has a waveguide structure shown in FIGS. 1 and 2B. As described above, in the fabricating method (a method for producing a Mach-Zehnder modulator), the first mask 55 is formed on the semiconductor laminate 53, which includes the first conductivity semiconductor layer 53a for the cladding layer, the second semiconductor layer 53b for the core layer, the third semiconductor layer 53c for the conductive cladding layer, and the fourth semiconductor layer 53d for the contact layer. The first fourth semiconductor layer 53d for the contact layer in the semiconductor laminate 53 is etched with the first mask 55 to form a patterned semiconductor layer 57. After removing the first mask 55, the second mask 59 having a pattern for the arm waveguides is formed on the patterned semiconductor layer 57 and the semiconductor stack 53. The patterned semiconductor layer 57 and the semiconductor stack 53 are etched with the second mask 59 to form a waveguide mesa 63 for branching waveguides and arm waveguides.

In the fabricating method, the edges (57a, 57b, 57d, 57e) of the preliminary-patterned semiconductor layer 57 form respective angles, which are not equal to zero degrees and a right angle, with the [1-10] axis of III-V compound semiconductor crystal of the semiconductor layer 57. As such, the edge of the pre-patterned semiconductor layer 57 is oblique at an angle different from zero degrees and a right angle with respect to the waveguide mesa. This fabricating method can form the contact layer 43 that is terminated on the top surface of the waveguide mesa 63, and further can prevent the unwanted semiconductor wall from being formed in association with the structure for this termination.

Specifically, the second mask 59 has a pattern including the 11-th edge 59aa (the 21-th edge 59ba) and the 12-th edge 59ab (the 22-th edge 59bb) that define the one side and the other side of the waveguide mesa 63 for the arm waveguide, respectively. Each of the 11-th edge 59aa (the 21 edge 59ba) and the 12-th edge 59ab (the 22-th edge 59bb) is not orthogonal to the edge of the patterned semiconductor layer 57 at respective intersections where the first 11-th edge 59aa (the 21-th edge 59ba) and the 12-th edge 59ab edge (the 22-th edge 59bb) pass over the edge of the patterned semiconductor layer 57. Specifically, the first edge 57a (57d) of the semiconductor layer 57 is inclined at the first intersection angle, different from that of 90 degrees, with respect to the 11-th edge 59aa (the 21-th edge 59ba). The second edge 57b (57e) of the patterned semiconductor layer 57 is inclined at a second intersection angle, different from 90 degrees, with respect to the 12-th edge 59ab (the 22-th edge 59bb).

The semiconductor laminate 53 is disposed on the InP primary surface 51a of the InP substrate 51, and the InP primary surface 51a has the 11-th area 51b, the 12-th areas 51c and the 13-th area 51d. The 11-th area 51b, the 12-th area 51c, and the 13-th area 51d are arranged in order in the direction of the waveguide axis. The waveguide mesa 63 comprises the first mesa structure 63b, the second mesa structure 63c, and the third mesa structure 63d (see FIG. 8). The first mesa structure 63b, the second mesa structure 63c, and the third mesa structure 63d are provided on the 11-th area 51b, the 12-th area 51c and the 13-th area 51d, respectively. The first mesa structure 63b includes a semiconductor laminate 41; the second mesa structure 63c includes a semiconductor laminate 41, and a first contact portion 43a provided on the top of the semiconductor laminate 41; and the third mesa structure 63d includes the semiconductor laminate 41, and the second contact portion 43b provided on the top of the semiconductor laminate 41. The first contact portion 43a and the second contact portion 43b constitute a contact layer 43.

Further, explanation will be made with reference to symbols shown in FIGS. 2A, 2B, 2C and 2D. The second mesa structure 63c includes a first waveguide side (35a) and a second waveguide side (35b). The first contact portion 43a of the second mesa structure 63c has the edge (43c) at which the contact layer 43 is terminated on the top of the semiconductor laminate 41. The edge (43c) extends in the direction of the first reference plane (RE1F) on the top surface (41c) of the semiconductor laminate 41 in the vicinity of the first waveguide side (35a) to reach the first waveguide side (35a). The first line of intersection where the first reference plane (RE1F) and the upper surface of the second mesa structure 63c intersect with each other is inclined to the upper edge of the first waveguide side (35a) at the first angle (AN1G) different from 90 degrees. The edge (43c) extends in the direction of the second reference plane (RE2F) on the top surface (41c) of the semiconductor laminate 41 in the vicinity of the second waveguide side (35b) to reach the second waveguide side (35b). The second line of intersection where the upper surface of the second mesa structure 63c and the second reference plane (2REF) intersect with each other is inclined to the upper edge of the second waveguide side (35b) at second angle (AN2G) different from 90 degrees.

The present embodiment has been described with reference to the semiconductor optical device, such as Mach-Zehnder modulator. The semiconductor optical device according to the embodiment has the uppermost layer (for example a contact layer) that is terminated on the waveguide mesa, and have no unwanted semiconductor walls produced in association with the termination so as to be connected to the waveguide mesa.

Figure 12:
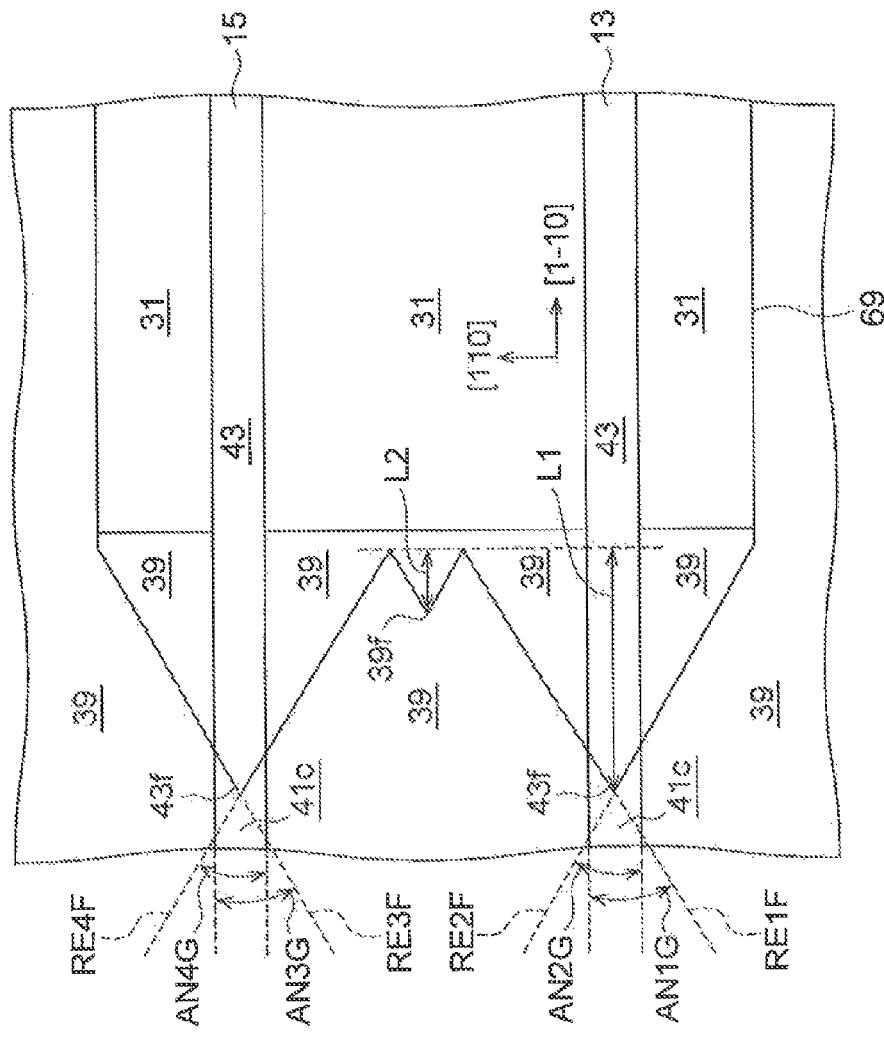
FIG. 12 is a plan view showing a semiconductor waveguide structure of the Mach-Zehnder modulator according to the present embodiment.

FIG. 12 is a plan view of a semiconductor waveguide structure of the Mach-Zehnder modulator according to the present embodiment. In the embodiment, the first acute-angle projection 43f of the second contact layer 43 in each of the first arm semiconductor waveguide 13 and the arm semiconductor waveguide 15 is provided on the top 41c of the semiconductor laminate 41. Preliminary patterning the semiconductor layer for the contact layer causes the contact layer 43 to have the first acute-angle projections 43f, and also causes the substrate 39 to have a second acute-angle projection 39f. The length L2 of the second acute-angle projection 39f is made smaller than the length L1 of the first acute angle projection 43f, so that the interval between the first arm semiconductor waveguide 13 and the second arm semiconductor waveguide 15 is made small.

Figure 13:
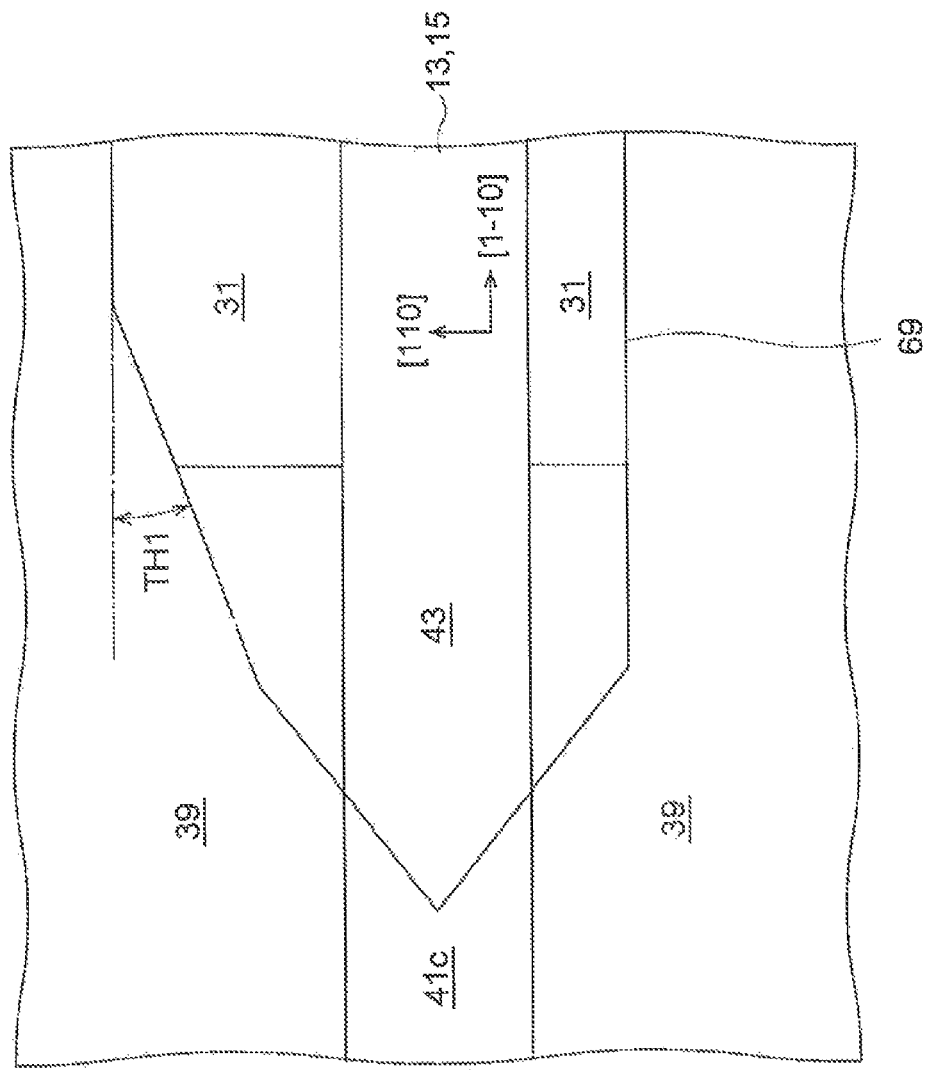
FIG. 13 is a plan view showing a semiconductor waveguide structure of the Mach-Zehnder modulator according to the present embodiment.

FIG. 13 is a plan view of a semiconductor waveguide structure of the Mach-Zehnder modulator according to the present embodiment. In the embodiment, the mask pattern for preliminary patterning the semiconductor layer for the contact layer may have an edge of a single line segment inclined at an angle relative to the [1-10] axis, and the mask pattern may have a number of line segments inclined at respective angles, each of which is different from others, relative to the [1-10] axis. In order not to form any reverse mesas at edges of the pre-patterned semiconductor layer in an area distant from the waveguide mesa, the angle TH1 is an angle of half of the angle TH2 or less with respect to the [1-10] axis.

Figure 14:
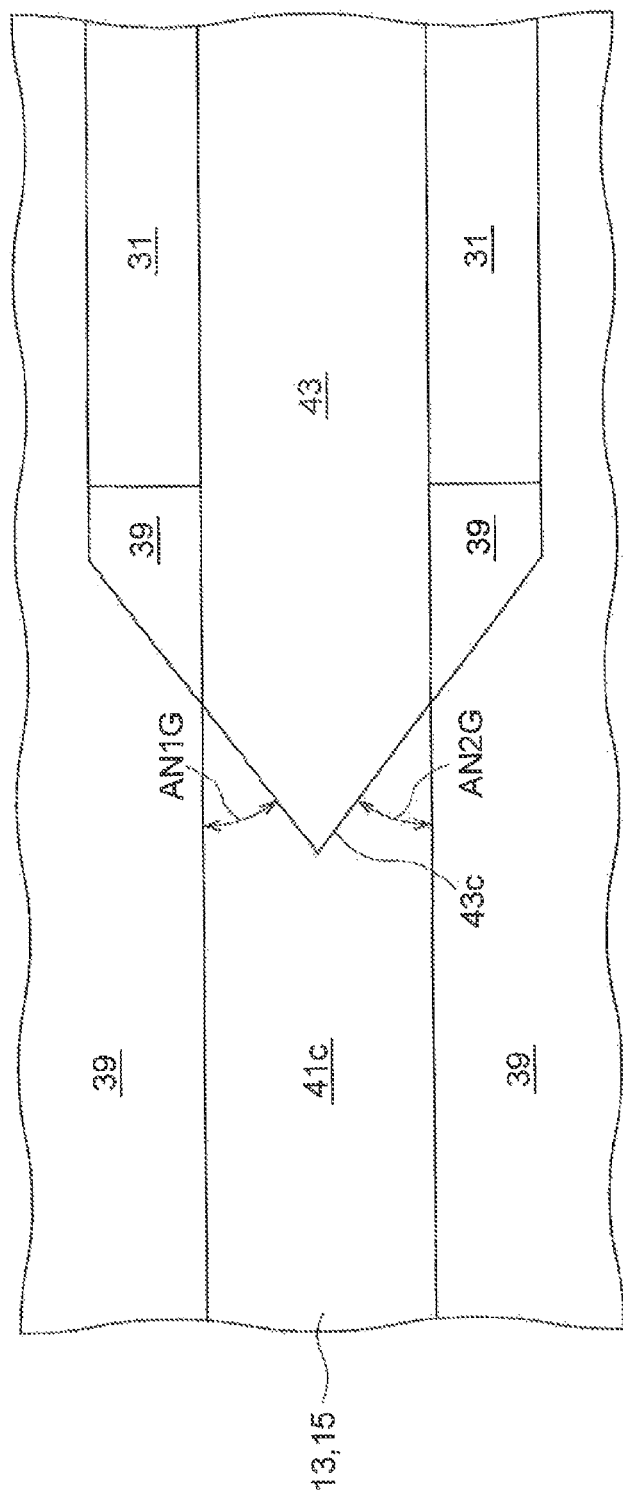
FIG. 14 is a plan view showing a semiconductor waveguide structure of the Mach-Zehnder modulator according to the present embodiment.

FIG. 14 is a plan view of a semiconductor waveguide structure of the Mach-Zehnder modulator according to the present embodiment. In the embodiment, in order to avoid formation of undesired semiconductor walls, the angle between the contact layer and the side of the waveguide is 60 degrees or less. In this example, the first angle AN1G may be different from the second angle AN2G. In the present embodiment, positioning the tip of the contact layer at the substantially center of the top of the waveguide mesa allows the formation of a desired shape with high stability.

Figure 15:
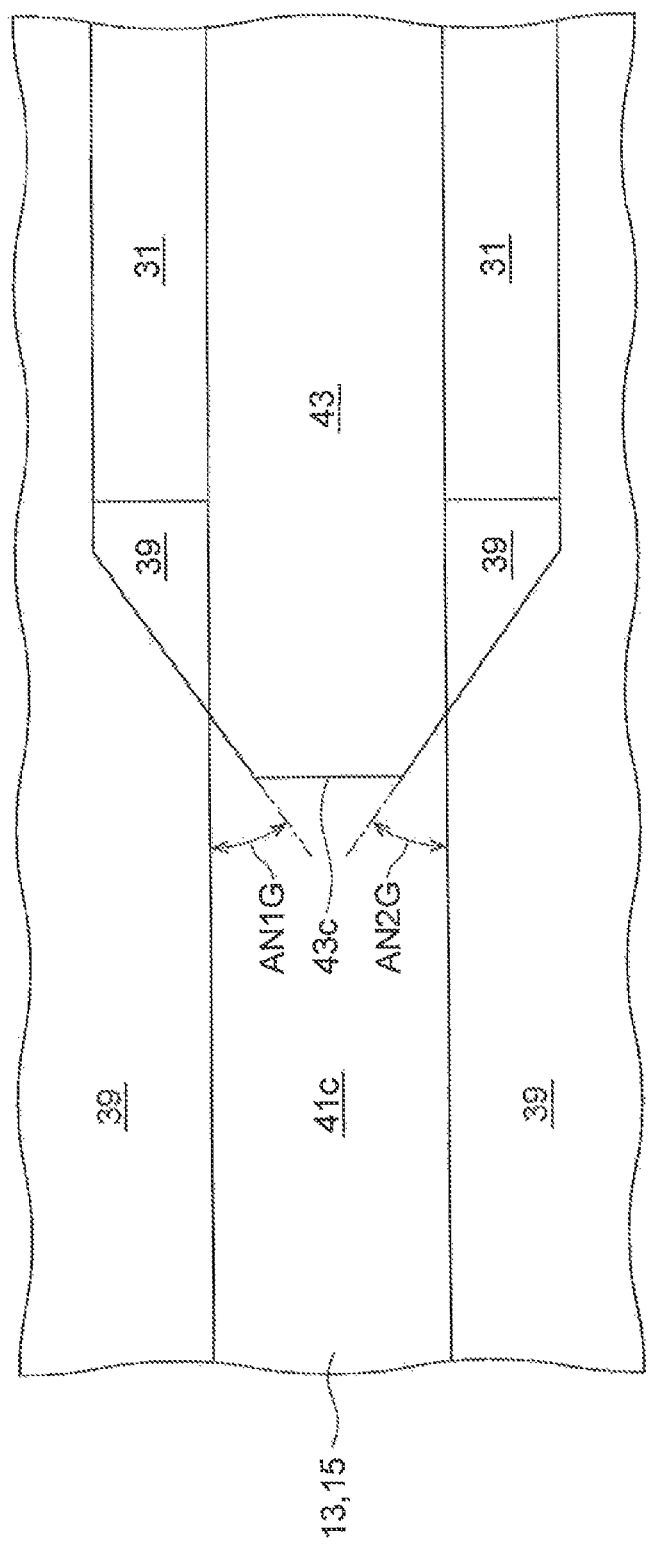
FIG. 15 is a plan view showing a semiconductor waveguide structure of the Mach-Zehnder modulator according to the present embodiment.

The present embodiment is not limited to, the edges of the contact layer meet at a single vertex on the top surface of the waveguide mesa. FIG. 15 is a plan view of a semiconductor waveguide structure of the Mach-Zehnder modulator according to the present embodiment. In the embodiment, in the vicinity of both edges of the top of the waveguide, the edge of the contact layer has a shape determined such that the angle between the side of the waveguide and the contact layer is 60 degrees or less, and in the area distant from both sides of the waveguide, the edges of the contact layer extends in a direction substantially perpendicular to the [1-10] axis on the top of the waveguide. On the top of the waveguide, the edges of the contact layer may be connected not to form a protrusion, and the edges of the contact layer may extend linearly in a direction inclined with respect to [1-10] axis.

Figure 16:
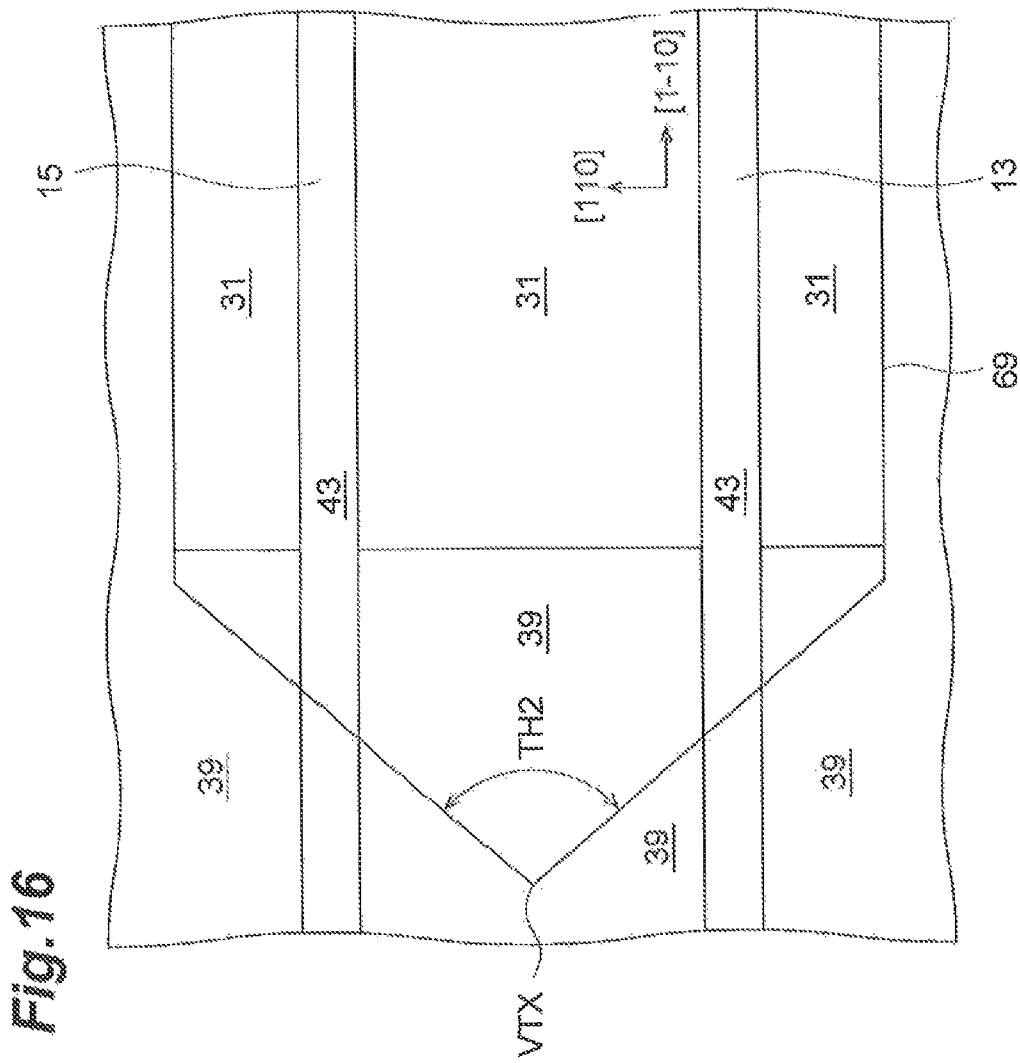
FIG. 16 is a plan view showing a semiconductor waveguide structure of the Mach-Zehnder modulator according to the present embodiment.

The embodiment is not limited to the contact layer 43 of the edge 43c comprising a plurality of line segments on the top of the waveguide mesa, and the edge 43c of the contact layer 43 may extend along a single straight line. FIG. 16 is a plan view of a semiconductor waveguide structure of the Mach-Zehnder modulator according to the present embodiment. In the embodiment, in order to reduce the difference in propagation characteristics between the first arm semiconductor waveguide 13 and the second arm semiconductor waveguide 15, the shape of the preliminary-patterned semiconductor layer may have the symmetry axis that extends along the primary surface of the substrate and is defined at the center of the area located between the first arm semiconductor waveguides 13 and the second arm semiconductor waveguide 15. The edge of the preliminary-patterned semiconductor layer is inclined with respect to [1-10] axis in the vicinity of the area where the first arm semiconductor waveguide 13 and the second arm semiconductor waveguide 15 are to be formed. The two edges of the patterned semiconductor layer may meet at the vertex to form the shape of the projection VTX. Preferably, an angle at the vertex VTX is about 120 degrees, and may be a range of 5 degrees or more and 120 degrees or less.

Figure 17:
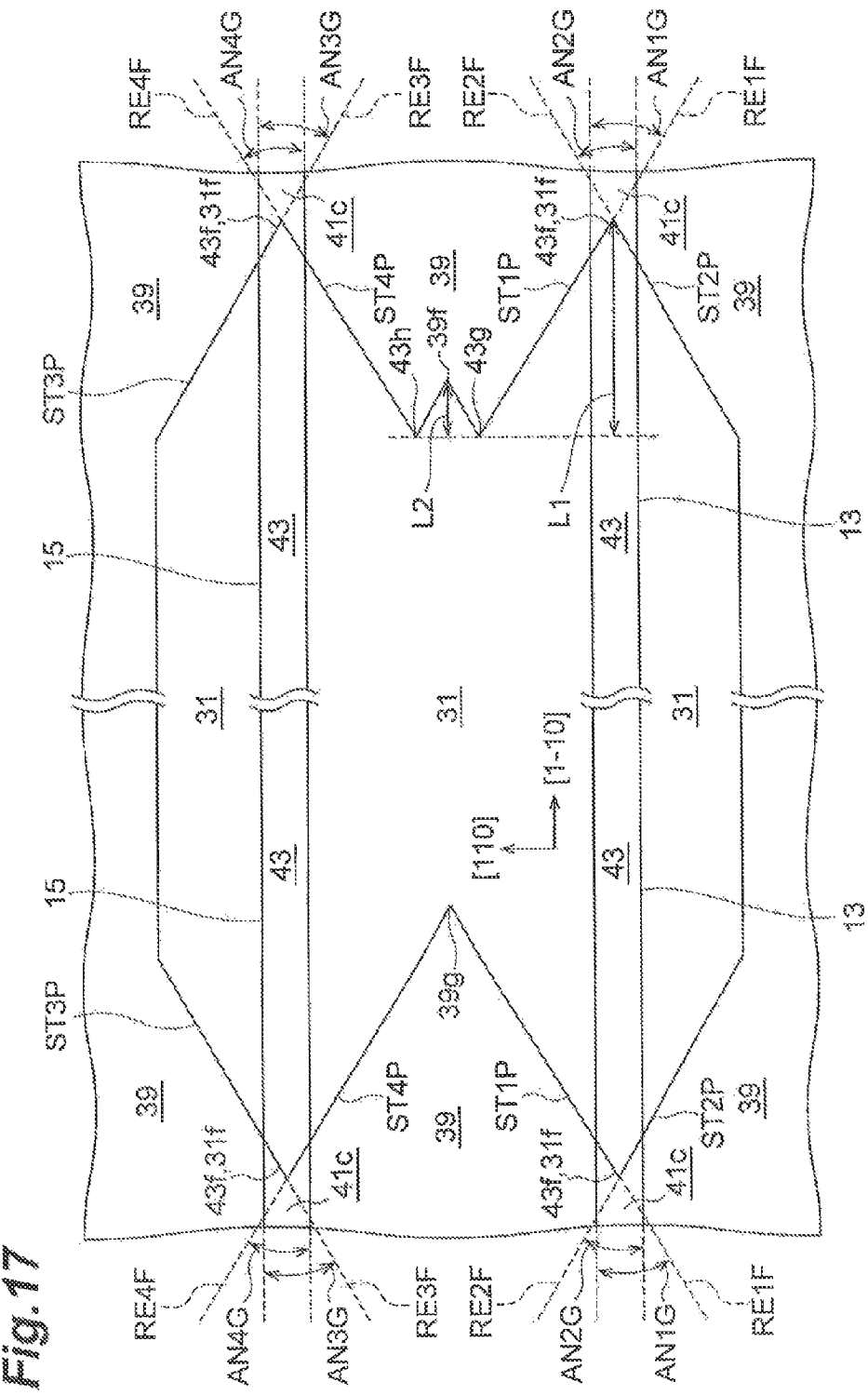
FIG. 17 is a plan view showing a semiconductor region, shown in FIGS. 2A and 12, which includes the arm waveguides in the Mach-Zehnder modulator.

FIG. 17 is a plan view of the two arm waveguides in the Mach-Zehnder modulator according to the present embodiment. As shown in FIG. 1A, each of the two arm waveguides has one end connected to the optical branch of the Mach-Zehnder modulator, and the other end connected to the other optical branch of the Mach-Zehnder modulator. The semiconductor region shown in FIG. 17 includes both terminations of the contact layer in each of the arm waveguides of the Mach-Zehnder modulator according to the present embodiment. In the semiconductor region of the Mach-Zehnder modulator shown in FIG. 17, the structure shown in FIG. 2A is included in the vicinity of one of the first branching semiconductor waveguide 17 and the second branch semiconductor waveguide 19. This structure has the first terrace ST1P and the fourth terrace ST4P, which are connected to each other on the third area 39d to form a notch 39g such that the two sides of the notch 39g form an acute angle. The first terrace ST1P and the fourth terrace ST4P extend along the direction of the first reference plane RE1F and the second reference plane RE4F, respectively, and the first terrace ST1P and the fourth terrace ST4P are connected in the area 39d to form a notch 39g. This joint of the terraces can prevent undesired semiconductor walls (semiconductor walls 7 shown in FIG. 2A) from being formed in the area between the first arm semiconductor waveguide 13 and the second arm semiconductor waveguide 15. Such unwanted semiconductor walls deteriorate the electrical performance of the Mach-Zehnder modulator.

The semiconductor regions of the Mach-Zehnder modulator, at least one of the first terrace ST1P and the fourth terrace ST4P may be bent at one or more locations to form one or more notches corresponding to the bent portions. Specifically, in the semiconductor region of the Mach-Zehnder modulator shown in FIG. 17, the structure shown in FIG. 12 is included in the vicinity of the other of the first branching semiconductor waveguide 17 and the second branching semiconductor waveguide 19. In this structure, the first terrace ST1P has a notch 43g on the third area 39d, and the fourth terrace ST4P has a notch 43h on the third area 39d. Each of the notches 43g and 43h has the two sides forming an acute angle. The first terrace ST1P and the fourth terrace ST4P are connected in the third area 39d to form a second acute-angled projection 39f. The second acute-angled projection 39f has a protruding length L2 defined with respect to the root of one of the notches 43g and 43h in the extending direction of the first arm semiconductor waveguide 13 and the second arm semiconductor waveguide 15. With respect to the root, the first acute-angled projection 43f protrudes toward the extending direction by the projecting length L1. The length L1 is greater than the length L2. In the conductive semiconductor region 31, the terraces ST1P and ST2P extend along the respective reference planes RE1F and RE2F to reach the first arm semiconductor waveguide 13, and the reference planes RE1F and RE2F intersect with each other at a crossing line 31f, which passes through the first arm semiconductor waveguide 13, to form an acute angle corresponding to the first acute angle projection 43f. The terraces ST3P and RE4P extending along the respective reference planes RE3F and RE4F to reach the second arm semiconductor waveguide 15, and the reference planes RE3F and RE4F intersect with each other at a crossing line 31f, which passes through the second arm semiconductor waveguide 15, to form an acute angle corresponding to the first acute angle projection 43f. The first acute-angled projection 43f also protrudes in the above extending direction by nearly the length L1. The second acute-angled projection 39f is directed in the same direction as the first acute-angled projection 43f. The second acute-angled projection 39f of a length L2 allows the can reduction in the length of the first acute-angled projection 39f, leading to the shortened arm semiconductor waveguides.

The conductive semiconductor region 31 includes the terraces ST1P and ST2P, which extend along the reference planes RE1F and RE2F respectively, to obliquely connect to the respective sides of the first arm semiconductor waveguide 13, and an angle between the reference planes RE1F and RE2F at the crossing line 31f corresponds to the first acute-angled projection 43f. The upper edges of the terraces ST1P and ST2P form acute angles with the respective sides of the first arm semiconductor waveguide 13, and the lower edges of the terraces ST1P and ST2P form acute angles with the respective sides of the first arm semiconductor waveguide 13. The conductive semiconductor region 31 also includes the terraces ST3P and ST4P, which extend along the reference planes RE3F and RE4F respectively, to obliquely connect to the respective sides of the second arm semiconductor waveguide 15, and an angle between the reference planes RE3F and RE4F at the crossing line 31f corresponds to the first acute-angled projection 43f. The upper edges of the terraces ST3P and ST4F form acute angles with the respective sides of the second arm semiconductor waveguide 15, and the lower edges of the terraces ST3P and ST4P form acute angles with the respective sides of the second arm semiconductor waveguide 15.

The semiconductor region of FIG. 17 includes the structures shown in FIGS. 2B and 12 at the respective edges of the contact layer in each arm waveguide. The Mach-Zehnder modulator according to the present embodiment is not limited to the structure shown in FIG. 17, and may comprise typical structures as follows:

For example, the structure shown in FIG. 2B may be combined with at least one of the structures shown in FIGS. 12 to 16.
For example, the structure shown in FIG. 12 may be combined with at least one of the structures shown in FIGS. 13 to 16.
For example, the structure shown in FIG. 13 can be combined with at least one of the structures shown in FIGS. 14 to 16.
For example, the structure shown in FIG. 14 may be combined with at least one of the structures shown in FIGS. 15 and 16.
For example, the structure shown in FIG. 15 can be combined with the structure FIG. 16.

Having described and illustrated the principle of the invention in a preferred embodiment thereof, it is appreciated by those having skill in the art that the invention can be modified in arrangement and detail without departing from such principles. We therefore claim all modifications and variations coming within the spirit and scope of the following claims.

What is claimed is:

1. A Mach-Zehnder modulator comprising:
a conductive semiconductor region provided on a primary surface of a substrate;
a first semiconductor structure provided on the conductive semiconductor region, the first semiconductor structure including an optical branching coupler and a part of a first arm semiconductor waveguide;
a second semiconductor structure provided on the conductive semiconductor region, the second semiconductor structure including a part of the first arm semiconductor waveguide; and
a third semiconductor structure provided on the conductive semiconductor region, the third semiconductor structure including a part of the first arm semiconductor waveguide,
the primary surface having first to third areas, the first to third areas being arranged sequentially in a waveguide axis, the first to third semiconductor structures being provided on the first to third areas, respectively,
the first semiconductor structure including a semiconductor laminate, the semiconductor laminate including a first cladding layer, a core layer and a second cladding layer, the first cladding layer, the core layer and the second cladding layer being arranged in a direction normal to the primary surface of the substrate,
the second semiconductor structure including the semiconductor laminate and a first contact portion provided on a top of the semiconductor laminate,
the third semiconductor structure including the semiconductor laminate and a second contact portion provided on the top of the semiconductor laminate,
the first contact portion and the second contact portion constituting a contact layer,
the second semiconductor structure having first and second waveguide sides of the first arm semiconductor waveguide,
the first contact portion of the second semiconductor structure having an edge,
the edge terminating the contact layer,
the edge extending in a direction of a first reference plane on the top of the semiconductor laminate to reach the first waveguide side,
the first reference plane and a top of the second semiconductor structure intersecting with each other to define a line of intersection obliquely-crossed with an upper edge of the first waveguide side at a first angle of not less than 2.5 degrees,
the edge extending in a direction of a second reference plane on the top of the semiconductor laminate to reach the second waveguide side, and
the second reference plane and the top of the second semiconductor structure intersecting with each other to define a line of intersection obliquely-crossed with an upper edge of the second waveguide side at a second angle that is different from a right angle.

2. The Mach-Zehnder modulator according to claim 1, further comprising an electrode in contact with the contact layer of the third semiconductor structure.

3. The Mach-Zehnder modulator according to claim 1, wherein the contact layer has a thickness of not less than 10 nm and not more than 400 nm.

4. The Mach-Zehnder modulator according to claim 1, further comprising an electrode in contact with the conductive semiconductor region in the third area.

5. The Mach-Zehnder modulator according to claim 1, wherein the first angle is not more than 60 degrees.

6. The Mach-Zehnder modulator according to claim 1, wherein
the first semiconductor structure, the second semiconductor structure and the third semiconductor stricture further include respective parts of a second arm semiconductor waveguide,
the second arm semiconductor waveguide includes another semiconductor laminate, the Mach-Zehnder modulator further comprises first to fourth terraces, the first to fourth terraces are disposed in the second and third areas, the first terrace is obliquely connected with a bottom edge of the first waveguide side of the first arm semiconductor waveguide, the second terrace is obliquely-connected with a bottom edge of the second waveguide side of the first arm semiconductor waveguide, the third terrace is obliquely-connected with a bottom edge of a first waveguide side of the second arm semiconductor waveguide, and the second terrace is obliquely-connected with a bottom edge of a second waveguide side of the second arm semiconductor waveguide.

7. The Mach-Zehnder modulator according to claim 6, wherein the first and second terraces extend in the directions of the first and second reference planes, respectively, and the first and fourth terraces connect with each other in the third area to form a notch.

8. The Mach-Zehnder modulator according to claim 6, wherein each of the first and fourth terraces has one or more notches, and the first and fourth terraces connect with each other in the third area to form a protrusion.

9. A Mach-Zehnder modulator comprising:
a conductive, semiconductor region provided on a primary surface of a substrate;
a first semiconductor structure provided on the conductive semiconductor region, the first semiconductor structure including an optical branching coupler and a part of a first arm semiconductor waveguide;
a second semiconductor structure provided on the conductive semiconductor region, the second semiconductor structure including a part of the first arm semiconductor waveguide; and
a third semiconductor structure provided on the conductive semiconductor region, the third semiconductor structure including a part of the first arm semiconductor waveguide,
the primary surface having first to third areas, the first to third areas being arranged sequentially in a waveguide axis, the first to third semiconductor structures being provided on the first to third areas, respectively,
the first semiconductor structure including a semiconductor laminate, the semiconductor laminate including a first cladding layer, a core layer and a second cladding layer, the first cladding layer, the core layer and the second cladding layer being arranged in a direction normal to the primary surface of the substrate,
the second semiconductor structure including the semiconductor laminate and a first contact portion provided on a top of the semiconductor laminate,
the third semiconductor structure including the semiconductor laminate and a second contact portion provided on the top of the semiconductor laminate,
the first contact portion and the second contact portion constituting a contact layer,
the second semiconductor structure having first and second waveguide sides of the first arm semiconductor waveguide,
the first contact portion of the second semiconductor structure having an edge,
the edge terminating the contact layer,
the edge extending in a direction of a first reference plane on the top of the semiconductor laminate to reach the first waveguide side,
the first reference plane and a top of the second semiconductor structure intersecting with each other to define a line of intersection obliquely-crossed with an upper edge of the first waveguide side at a first angle that is different from a right angle,
the edge extending in a direction of a second reference plane on the top of the semiconductor laminate to reach the second waveguide side, and
the second reference plane and the top of the second semiconductor structure intersecting with each other to define a line of intersection obliquely-crossed with an upper edge of the second waveguide side at a second angle that is different from a right angle,
wherein an electrode is in contact with the conductive semiconductor region in the third area.

10. The Mach-Zehnder modulator according to claim 9, further comprising a another electrode in contact with the contact layer of the third semiconductor structure.

11. The Mach-Zehnder modulator according to claim 9, wherein the contact layer has a thickness of not less than 10 nm and not more than 400 nm.

12. The Mach-Zehnder modulator according to claim 9, wherein the first angle is not less than 2.5 degrees.

13. The Mach-Zehnder modulator according to claim 9, wherein the first angle is not more than 60 degrees.

14. The Mach-Zehnder modulator according to claim 9, wherein the first angle is not less than 2.5 degrees, and the first angle is not more than 60 degrees.

15. A Mach-Zehnder modulator comprising:
a conductive semiconductor region provided on a primary surface of a substrate;
a first semiconductor structure provided on the conductive semiconductor region, the first semiconductor structure including an optical branching coupler and a part of a first arm semiconductor waveguide;
a second semiconductor structure provided on the conductive semiconductor region, the second semiconductor structure including a part of the first arm semiconductor waveguide; and
a third semiconductor structure provided on the conductive semiconductor region, the third semiconductor structure including a part of the first arm semiconductor waveguide,
the primary surface having first to third areas, the first to third areas being arranged sequentially in a waveguide axis, the first to third semiconductor structures being provided on the first to third areas, respectively,
the first semiconductor structure including a semiconductor laminate, the semiconductor laminate including a first cladding layer, a core layer and a second cladding layer, the first cladding layer, the core layer and the second cladding layer being arranged in a direction normal to the primary surface of the substrate,
the second semiconductor structure including the semiconductor laminate and a first contact portion provided on a top of the semiconductor laminate,
the third semiconductor structure including the semiconductor laminate and a second contact portion provided on the top of the semiconductor laminate,
the first contact portion and the second contact portion constituting a contact layer,
the second semiconductor structure having first and second waveguide sides of the first arm semiconductor waveguide,
the first contact portion of the second semiconductor structure having an edge,
the edge terminating the contact layer,
the edge extending in a direction of a first reference plane on the top of the semiconductor laminate to reach the first waveguide side, the first reference plane and a top of the second semiconductor structure intersecting with each other to define a line of intersection obliquely-crossed with an upper edge of the first waveguide side at a first angle that is different from a right angle, the edge extending in a direction of a second reference plane on the top of the semiconductor laminate to reach the second waveguide side, the second reference plane and the top of the second semiconductor structure intersecting with each other to define a line of intersection obliquely-crossed with an upper edge of the second waveguide side at a second angle that is different from a right angle, the first semiconductor structure, the second semiconductor structure and the third semiconductor structure further include respective parts of a second arm semiconductor waveguide, the second arm semiconductor waveguide includes another semiconductor laminate, and the Mach-Zehnder modulator further comprises first to fourth terraces, the first to fourth terraces are disposed in the second and third areas, the first terrace is obliquely-connected with a bottom edge of the first waveguide side of the first arm semiconductor waveguide, the second terrace is obliquely-connected with a bottom edge of the second waveguide side of the first arm semiconductor waveguide, the third terrace is obliquely-connected with a bottom edge of a first waveguide side of the second arm semiconductor waveguide, and the second terrace is obliquely-connected with a bottom edge of a second waveguide side of the second arm semiconductor waveguide.

16. The Mach-Zehnder modulator according to claim 15, further comprising a first electrode in contact with the contact layer of the third semiconductor structure.

17. The Mach-Zehnder modulator according to claim 15, wherein the contact layer has a thickness of not less than 10 nm and not more than 400 nm.

18. The Mach-Zehnder modulator according to claim 15, further comprising another electrode in contact with the conductive semiconductor region in the third area.

19. The Mach-Zehnder modulator according to claim 15, wherein the first angle is not less than 2.5 degrees.

20. The Mach-Zehnder modulator according to claim 19, wherein the first angle is not more than 60 degrees.

* * * * *